(12) United States Patent
Ma et al.

(10) Patent No.: US 12,471,127 B2
(45) Date of Patent: Nov. 11, 2025

(54) INTERFERENCE MEASUREMENT BASED ON MULTIPLE SENSING RESOURCE CANDIDATES

(71) Applicant: QUALCOMM Incorporated, San Diego, CA (US)

(72) Inventors: Ruifeng Ma, Beijing (CN); Yuwei Ren, Beijing (CN); Huilin Xu, Temecula, CA (US)

(73) Assignee: Qualcomm Incorporated, San Diego, CA (US)

( * ) Notice: Subject to any disclaimer, the term of this patent is extended or adjusted under 35 U.S.C. 154(b) by 494 days.

(21) Appl. No.: 18/002,242

(22) PCT Filed: Jul. 16, 2021

(86) PCT No.: PCT/CN2021/106668
§ 371 (c)(1),
(2) Date: Dec. 16, 2022

(87) PCT Pub. No.: WO2022/012650
PCT Pub. Date: Jan. 20, 2022

(65) Prior Publication Data
US 2023/0300868 A1    Sep. 21, 2023

(30) Foreign Application Priority Data
Jul. 16, 2020 (WO) ................ PCT/CN2020/102439

(51) Int. Cl.
*H04B 17/345* (2015.01)
*H04W 24/08* (2009.01)
*H04W 72/541* (2023.01)

(52) U.S. Cl.
CPC ........ *H04W 72/541* (2023.01); *H04B 17/345* (2015.01); *H04W 24/08* (2013.01)

(58) Field of Classification Search
CPC ... H04B 17/318; H04B 17/345; H04L 5/0035; H04L 5/0048; H04L 5/0051; H04W 24/08; H04W 72/541; H04W 24/10
See application file for complete search history.

(56) References Cited

U.S. PATENT DOCUMENTS

2019/0260486 A1* 8/2019 Kang .................... H04L 5/0007

FOREIGN PATENT DOCUMENTS

| CN | 106301628 A | 1/2017 |
|----|-------------|--------|
| CN | 110049510 A | 7/2019 |

(Continued)

OTHER PUBLICATIONS

Intel Corporation: "UE Features in CLI/RIM", 3GPP TSG RAN WG1 #100b-e, R1-2002686, Apr. 20-30, 2020, E-Meeting, Apr. 30, 2020, 3 Pages. The Whole Document, section 2.

(Continued)

*Primary Examiner* — Melvin C Marcelo
*Assistant Examiner* — Natali Pascual Peguero
(74) *Attorney, Agent, or Firm* — Holland & Hart LLP

(57) ABSTRACT

Methods, systems, and devices for wireless communications are described. A communication device, such as a user equipment (UE) may receive an allocation of a set of sensing resources and a set of cross-link interference measurement resources. The UE may identify a sensing resource of the set of sensing resources on which a sensing signal is received, and determine one or more of the set of cross-link interference measurement resources that overlap with the sensing resource. The UE may thereby measure the one or more cross-link interference measurement resources for cross-link interference based on the one or more cross-link interference measurement resources overlapping with the sensing resource.

30 Claims, 17 Drawing Sheets

(56) References Cited

FOREIGN PATENT DOCUMENTS

| CN | 111278119 A | 6/2020 |
|----|-------------|--------|
| WO | WO-2018128851 A2 | 7/2018 |
| WO | WO-2019232690 A1 | 12/2019 |

OTHER PUBLICATIONS

International Search Report and Written Opinion—PCT/CN2020/102439—ISA/EPO—Apr. 16, 2021.
International Search Report and Written Opinion—PCT/CN2021/106668—ISA/EPO—Sep. 24, 2021.
NTT DOCOMO, Inc: "Summary on [101-e-NR-UEFeatures-CLIRIM-01]", R1-2004825, 3GPP TSG RAN WG1 #101-e, e-Meeting, May 25-Jun. 5, 2020, Jun. 5, 2020 (Jun. 5, 2020) the Whole Document, pp. 1-9.

\* cited by examiner

INTERFERENCE MEASUREMENT BASED ON MULTIPLE SENSING RESOURCE CANDIDATES

CROSS REFERENCE

The present Application is a 371 national stage filing of International PCT Application No. PCT/CN2021/106668 by Ma et al. entitled "INTERFERENCE MEASUREMENT BASED ON MULTIPLE SENSING RESOURCE CANDIDATES," filed Jul. 16, 2021; and claims priority to International Patent Application No. PCT/CN2020/102439 by Ma et al., entitled "INTERFERENCE MEASUREMENT BASED ON MULTIPLE SENSING RESOURCE CANDIDATES," filed Jul. 16, 2020, each of which is assigned to the assignee hereof, and each of which is expressly incorporated by reference in its entirety herein.

FIELD OF TECHNOLOGY

The following relates to wireless communications and more specifically to interference measurement based on multiple sensing resource candidates.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some communication devices may be configured to transmit sensing signals, for example, radar sensing signals or millimeter wave (mmW) sensing signals for various types of applications, such as object detection and classification applications, among other examples. These communication devices may, however, experience or cause interference to other communication devices (e.g., UEs) due to these communication devices being configured with sensing capability in a communication band (e.g., a radio frequency spectrum band), which may impact a reliability for wireless communication for the communication devices.

SUMMARY

Various aspects of the described techniques relate to configuring a communication device, which may be a UE to manage cross-link interference. The UE may be configured with multiple sensing resources, as well as cross-link interference resources (e.g., time and frequency resources to be used by the UE for measuring cross-link interference). The sensing resources and the cross-link interference resources may overlap in a time domain or a frequency domain, or both. If these resources do overlap, the UE may perform cross-link interference measurements on the cross-link interference resources that overlap with the sensing resources. Otherwise, when cross-link interference resources do not overlap with the sensing resources, the UE may avoid any cross-link interference measurements on the cross-link interference resources. Because the UE is configured with multiple sensing resources, the UE may be able to determine a sensing resource that is not subject to cross-link interference, and the UE may report this to a network (e.g., a base station). The described techniques may, as a result, include features for improvements to sensing and interference measurement operations and, in some examples, may promote high reliability and low latency communications, among other benefits.

A method of wireless communication at a UE is described. The method may include receiving an allocation of a set of sensing resources and a set of cross-link interference measurement resources, identifying a sensing resource of the set of sensing resources on which a sensing signal is received, determining one or more of the set of cross-link interference measurement resources that overlap with the sensing resource, and measuring the one or more cross-link interference measurement resources for cross-link interference based on the one or more cross-link interference measurement resources overlapping with the sensing resource.

An apparatus for wireless communication is described. The apparatus may include a processor, memory coupled with the processor, and instructions stored in the memory. The instructions may be executable by the processor to cause the apparatus to receive an allocation of a set of sensing resources and a set of cross-link interference measurement resources, identify a sensing resource of the set of sensing resources on which a sensing signal is received, determine one or more of the set of cross-link interference measurement resources that overlap with the sensing resource, and measure the one or more cross-link interference measurement resources for cross-link interference based on the one or more cross-link interference measurement resources overlapping with the sensing resource.

Another apparatus for wireless communication is described. The apparatus may include means for receiving an allocation of a set of sensing resources and a set of cross-link interference measurement resources, identifying a sensing resource of the set of sensing resources on which a sensing signal is received, determining one or more of the set of cross-link interference measurement resources that overlap with the sensing resource, and measuring the one or more cross-link interference measurement resources for cross-link interference based on the one or more cross-link interference measurement resources overlapping with the sensing resource.

A non-transitory computer-readable medium storing code for wireless communication at a UE is described. The code may include instructions executable by a processor to receive an allocation of a set of sensing resources and a set of cross-link interference measurement resources, identify a sensing resource of the set of sensing resources on which a sensing signal is received, determine one or more of the set of cross-link interference measurement resources that overlap with the sensing resource, and measure the one or more cross-link interference measurement resources for cross-link interference based on the one or more cross-link interference measurement resources overlapping with the sensing resource.

In some examples of the method, apparatuses, and non-transitory computer-readable medium described herein, receiving the allocation of a set of sensing resources further may include operations, features, means, or instructions for receiving a configuration which includes a set of sensing resource identifiers, and determining the set of sensing resources based on the set of sensing resource identifiers.

Some examples of the method, apparatuses, and non-transitory computer-readable medium described herein may further include operations, features, means, or instructions for identifying a set of sensing parameters associated with the set of sensing resources, where at least one sensing parameter of the set of sensing parameters includes a bandwidth part (BWP).

In some examples of the method, apparatuses, and non-transitory computer-readable medium described herein, identifying the sensing resource of the set of sensing resources on which the sensing signal may be received further may include operations, features, means, or instructions for receiving a configuration that identifies the sensing resource from the set of sensing resources.

Some examples of the method, apparatuses, and non-transitory computer-readable medium described herein may further include operations, features, means, or instructions for determining to transmit a measurement report based on an indication received in a radio resource control (RRC) configuration message allocating the set of cross-link interference measurement resources, and transmitting the measurement report associated with the one or more measured cross-link interference measurement resources for the cross-link interference based on the indication.

Some examples of the method, apparatuses, and non-transitory computer-readable medium described herein may further include operations, features, means, or instructions for determining to refrain from transmitting a measurement report based on an indication received in an RRC configuration message allocating the set of cross-link interference measurement resources, and refraining from transmitting the measurement report associated with the one or more measured cross-link interference measurement resources for the cross-link interference based on the indication.

Some examples of the method, apparatuses, and non-transitory computer-readable medium described herein may further include operations, features, means, or instructions for determining a time and frequency resource pattern associated with the sensing resource of the set of sensing resources on which a sensing signal may be received.

Some examples of the method, apparatuses, and non-transitory computer-readable medium described herein may further include operations, features, means, or instructions for determining a subcarrier location associated with the sensing resource of the set of sensing resources on which a sensing signal may be received based on the time and frequency resource pattern associated with the sensing resource of the set of sensing resources.

Some examples of the method, apparatuses, and non-transitory computer-readable medium described herein may further include operations, features, means, or instructions for determining a symbol location associated with the sensing resource of the set of sensing resources on which a sensing signal may be received based on the time and frequency resource pattern associated with the sensing resource of the set of sensing resources.

Some examples of the method, apparatuses, and non-transitory computer-readable medium described herein may further include operations, features, means, or instructions for determining a periodicity associated with the sensing resource of the set of sensing resources on which a sensing signal may be received based on the time and frequency resource pattern associated with the sensing resource of the set of sensing resources.

Some examples of the method, apparatuses, and non-transitory computer-readable medium described herein may further include operations, features, means, or instructions for determining an offset associated with the sensing resource of the set of sensing resources on which a sensing signal may be received based on the time and frequency resource pattern associated with the sensing resource of the set of sensing resources.

Some examples of the method, apparatuses, and non-transitory computer-readable medium described herein may further include operations, features, means, or instructions for receiving, from a base station, an RRC configuration message including the allocation of the set of sensing resources and the set of cross-link interference measurement resources.

In some examples of the method, apparatuses, and non-transitory computer-readable medium described herein, the measuring may include operations, features, means, or instructions for measuring a signal strength metric associated with the sensing signal on the one or more cross-link interference measurement resources, the signal strength metric including a reference signal received power (RSRP) or a received signal strength indicator (RSSI), or both.

Some examples of the method, apparatuses, and non-transitory computer-readable medium described herein may further include operations, features, means, or instructions for determining the sensing resource of the set of sensing resources satisfies a threshold for sensing the sensing signal based on measuring the one or more cross-link interference measurement resources for the cross-link interference, and transmitting, to the base station, an indication of a resource index associated with the sensing resource.

Some examples of the method, apparatuses, and non-transitory computer-readable medium described herein may further include operations, features, means, or instructions for determining a maximum sensing range to use to determine a duration associated with the sensing signal based on the UE operating in a full-duplex mode, and determining the duration associated with the sensing signal using the maximum sensing range, where measuring the one or more cross-link interference measurement resources for the cross-link interference may be based on the duration associated with the sensing signal.

Some examples of the method, apparatuses, and non-transitory computer-readable medium described herein may further include operations, features, means, or instructions for determining a minimum sensing range to use to determine a duration associated with the sensing signal based on the UE operating in a half-duplex mode, and determining the duration associated with the sensing signal using the minimum sensing range, where measuring the one or more cross-link interference measurement resources for the cross-link interference may be based on the duration associated with the sensing signal.

A method of wireless communication at a base station is described. The method may include determining an allocation of a set of sensing resources and a set of cross-link interference measurement resources and transmitting, to a UE a configuration message including the allocation of the set of sensing resources and the set of cross-link interference measurement resources associated with the set of sensing resources, and an indication to measure one or more cross-link interference measurement resources for cross-link interference based on the one or more cross-link interference measurement resources overlapping with a sensing resource of the set of sensing resources.

An apparatus for wireless communication is described. The apparatus may include a processor, memory coupled with the processor, and instructions stored in the memory. The instructions may be executable by the processor to cause the apparatus to determine an allocation of a set of sensing resources and a set of cross-link interference measurement resources and transmit, to a UE a configuration message including the allocation of the set of sensing resources and the set of cross-link interference measurement resources associated with the set of sensing resources, and an indication to measure one or more cross-link interference measurement resources for cross-link interference based on the one or more cross-link interference measurement resources overlapping with a sensing resource of the set of sensing resources.

Another apparatus for wireless communication is described. The apparatus may include means for determining an allocation of a set of sensing resources and a set of cross-link interference measurement resources and transmitting, to a UE a configuration message including the allocation of the set of sensing resources and the set of cross-link interference measurement resources associated with the set of sensing resources, and an indication to measure one or more cross-link interference measurement resources for cross-link interference based on the one or more cross-link interference measurement resources overlapping with a sensing resource of the set of sensing resources.

A non-transitory computer-readable medium storing code for wireless communication at a base station is described. The code may include instructions executable by a processor to determine an allocation of a set of sensing resources and a set of cross-link interference measurement resources and transmit, to a UE a configuration message including the allocation of the set of sensing resources and the set of cross-link interference measurement resources associated with the set of sensing resources, and an indication to measure one or more cross-link interference measurement resources for cross-link interference based on the one or more cross-link interference measurement resources overlapping with a sensing resource of the set of sensing resources.

In some examples of the method, apparatuses, and non-transitory computer-readable medium described herein, transmitting the configuration message may include operations, features, means, or instructions for transmitting a set of sensing resource identifiers associated with the set of sensing resources in the configuration message.

In some examples of the method, apparatuses, and non-transitory computer-readable medium described herein, transmitting the configuration message may include operations, features, means, or instructions for transmitting a set of sensing parameters associated with the set of sensing resources in the configuration message.

In some examples of the method, apparatuses, and non-transitory computer-readable medium described herein, at least one sensing parameter of the set of sensing parameters includes a BWP.

In some examples of the method, apparatuses, and non-transitory computer-readable medium described herein, transmitting the configuration message further may include operations, features, means, or instructions for including, in the configuration message, an identifier which identifies the sensing resource from the set of sensing resources.

In some examples of the method, apparatuses, and non-transitory computer-readable medium described herein, the configuration message includes an indication to the UE whether to transmit a measurement report to the base station associated with the UE measuring the one or more cross-link interference measurement resources for the cross-link interference based on the one or more cross-link interference measurement resources overlapping with the sensing resource of the set of sensing resources.

Some examples of the method, apparatuses, and non-transitory computer-readable medium described herein may further include operations, features, means, or instructions for assigning a time and frequency resource pattern associated with the set of sensing resources, where the configuration message includes an indication of the time and frequency resource pattern associated with the set of sensing resources.

Some examples of the method, apparatuses, and non-transitory computer-readable medium described herein may further include operations, features, means, or instructions for assigning a subcarrier location associated with each sensing resource of the set of sensing resources, where the configuration message includes an indication of the subcarrier location associated with each sensing resource of the set of sensing resources.

Some examples of the method, apparatuses, and non-transitory computer-readable medium described herein may further include operations, features, means, or instructions for assigning a symbol location associated with each sensing resource of the set of sensing resources, where the configuration message includes an indication of the symbol location associated with each sensing resource of the set of sensing resources.

Some examples of the method, apparatuses, and non-transitory computer-readable medium described herein may further include operations, features, means, or instructions for assigning a periodicity associated with each sensing resource of the set of sensing resources, where the configuration message includes an indication of the periodicity associated with each sensing resource of the set of sensing resources.

Some examples of the method, apparatuses, and non-transitory computer-readable medium described herein may further include operations, features, means, or instructions for assigning an offset associated with each sensing resource of the set of sensing resources, where the configuration message includes an indication of the offset associated with each sensing resource of the set of sensing resources.

In some examples of the method, apparatuses, and non-transitory computer-readable medium described herein, the configuration message includes a high layer message.

In some examples of the method, apparatuses, and non-transitory computer-readable medium described herein, the higher layer message includes an RRC message.

DETAILED DESCRIPTION

Figure 1:
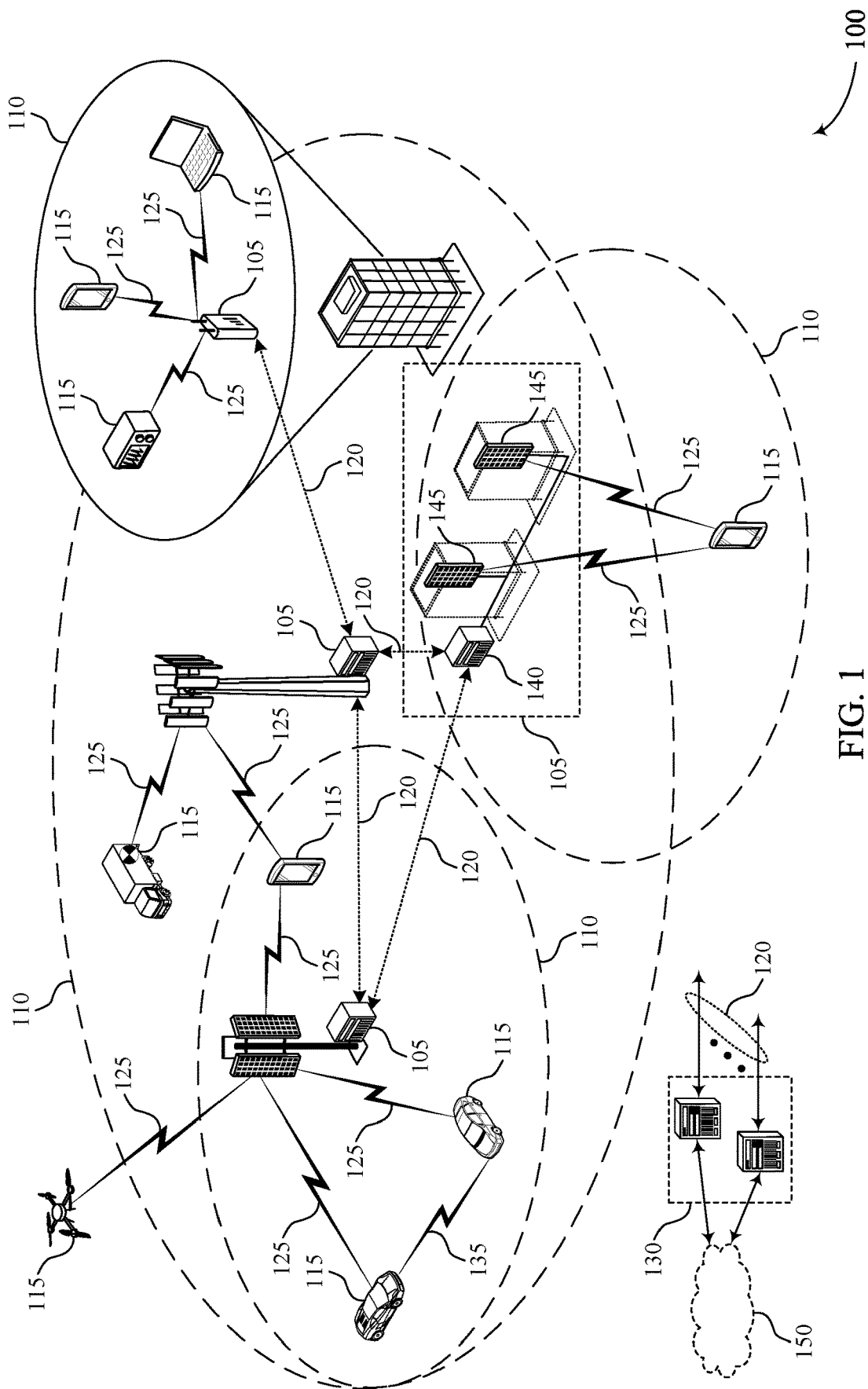
FIGS. 1 and 2 illustrate example of wireless communications systems that support interference measurement based on multiple sensing resource candidates in accordance with aspects of the present disclosure.

A wireless communications system may include communication devices, such as UEs and base stations, for example, next-generation NodeBs or giga-NodeBs (either of which may be referred to as a gNB) that may support multiple radio access technologies including 5G systems, which may be referred to as NR systems, among others. A communication device may be configured to transmit sensing signals, such as radar sensing signals or mmW sensing signals to support various types of sensing applications. For example, a sensing application may include hand gesture applications, multi-dimensional imaging application, virtual reality applications, beam tracking applications, localization applications, and the like.

A communication device may, in some cases, be able to transmit both information signals (also referred to as data signals) (e.g., uplink signals, sidelink signals) and sensing signals within a radio frequency spectrum band (also referred to as a communication band). The sensing occasions (or resources for sensing) are allocated by a base station. A communication device, such as a base station may allocate sensing resources to a sensing communication device (also referred to as a sensing UE) when other neighboring communication devices (e.g., other UEs) are scheduled for uplink transmissions. Thus, cross-link interference by the neighboring communication devices could interfere with the sensing performed by the sensing communication device. Likewise, sensing transmissions by the sensing communication device may provide cross-link interference for uplink transmission by the neighboring communication devices.

To determine the cross-link interference, a communication device, such as a base station may allocate cross-link interference resources to the sensing communication device on which the sensing communication device may measure for cross-link interference. However, the cross-link interference resources might not always be associated to sensing resources or configured with sensing-based interference measurement. Various aspects of the described techniques relate to configuring a sensing communication device to manage the cross-link interference. The sensing communication device may be configured with multiple sensing resources and cross-link interference resources, for example, time and frequency resources to be used by the sensing communication device for measuring cross-link interference.

The sensing resources and the cross-link interference resources may overlap in a time domain or a frequency domain. If these resources do overlap, the sensing communication device may perform cross-link interference measurements on the cross-link interference resources that overlap with the sensing resources. Otherwise, when cross-link interference resources do not overlap with the sensing resources, the sensing communication device may avoid cross-link interference measurements on those cross-link interference resources. As the sensing communication device is configured with multiple sensing resources, the sensing communication device may be able to determine a sensing resource that is not part of the cross-link interference, and the sensing communication device may report this to a network communication device (e.g., a base station). Therefore, the sensing communication device may be configured with multiple sensing resources, and then to, at least in some examples, autonomously determine a best sensing resource to use for sensing applications, after determining whether to make a cross-link interference measurement and based on the measurement itself.

Various aspects of the subject matter described in this disclosure may be implemented to realize one or more potential advantages. The techniques employed by the described communication devices may provide benefits and enhancements to the operation of the communication devices. For example, operations performed by the described communication devices may provide improvements to sensing operations. In some examples, the operations performed by the described communication devices to perform or avoid cross-link interference measurement operations may improve sensing operations by determining a best sensing resource to use after determining whether to make a cross-link interference measurement and based on the measurement itself. In some examples, operations performed by the described communication devices may support improvements to power consumption, reliability for sensing operations and, in some examples, low latency for sensing operations, among other benefits.

Aspects of the disclosure are initially described in the context of wireless communications systems. Aspects of the disclosure are further illustrated by and described with reference to apparatus diagrams, system diagrams, and flowcharts that relate to interference measurement based on multiple sensing resource candidates.

FIG. 1 illustrates an example of a wireless communications system 100 that supports interference measurement based on multiple sensing resource candidates in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be configured with radio frequency sensing capability to transmit sensing signals, such as radar sensing signals or millimeter wave (mmW) sensing signals for various types of sensing applications. For example, a UE 115 may be configured to transmit radar sensing signals to map (e.g., generate an image) of a physical environment based on information (e.g., range, doppler, or angle information) determined from the transmitted radar sensing signal. In some examples, the UE 115 may be configured to use a higher radio frequency spectrum band, a larger bandwidth, or a compact sensor array to improve a level of granularity for various types of sensing applications.

A UE 115 (e.g., a handheld radar device) may be configured to transmit sensing signals, such as radar sensing signals or mmW sensing signals for other sensing applications, such as gesture localization and gesture classification, as well as in-vehicle-based control sensing applications. The in-vehicle based control sensing application provides an alternative user interface for providing real-time data to one or more hardware and software components of a vehicle. Similarly, for handheld sensing applications, instead of typing with keys or tapping on a touch screen, a sensor perceives and interprets movements as data input. For example, a sensing integrated chip (IC) associated with the UE 115 may transmit sensing signals (e.g., radar signals) with a predefined waveform (e.g., a frequency-modulated continuous-wave (FMCW) waveform, a pulse waveform, among other examples).

The transmitted sensing signals may, in some examples, reflect from objects or persons in a physical environment and produce reflected sensing signals. The UE 115 may correlate the reflected sensing signals with the transmitted sensing signals to determine certain information, such as range, doppler, and angle information, which the UE 115 may use to determine a gesture classification and map it to a corresponding action. For example, in an in-vehicle-based control sensing application, the determined gesture classification may map to an action to change a radio station, to turn up the volume, or to turn down the volume, among other examples.

Transmission of sensing signals for various types of sensing applications by some UEs 115 may coexist with data transmissions by other UEs 115 in the wireless communications system 100. That is, a sensing signal transmission may coexist with a data transmission in a same communication band (e.g., a radio frequency spectrum band) in the wireless communications system 100. For example, a single mmW access point (AP) or mmW base station (e.g., a base station 105) may achieve both high data rate wireless communications with a UE 115, while the UE 115 may also provide sensing information for various types of sensing applications, such as to determine a target movement proximate to the UE 115. Embedding radio frequency sensing information in data transmission may provide one or more potential advantages, for example, for imaging a physical or virtual environment (e.g., three-dimensional (3D) mapping for virtual reality applications), high resolution localization (e.g., industrial IoT), assisting wireless communication operations (e.g., beam tracking), or machine learning-based applications (e.g., effective interface between human and machine interaction), among other examples.

In some cases, when a UE 115 is configured with sensing capability in a communication band of the wireless communications system 100, the UE 115 (the "sensing" UE 115) may be interfered by other UEs 115 in the wireless communications system 100. As noted previously herein, some UEs 115 may be able to transmit both data transmission signals (e.g., uplink signals, sidelink signals) and sensing signals within a communication band associated with the UEs 115. However, because the sensing UE 115 transmits sensing signals within the communication band, the sensing UE 115 may experience interference from other UEs 115. For example, a sensing UE 115 that transmits sensing signals on a communication band may experience interference due to communications (e.g., uplink signals) from another UE 115. In some examples, a sensing UE 115 may have a lower power level for transmitting uplink signals (e.g., uplink control information, uplink data), sensing signals (e.g., radar sensing signals, mmW sensing signals), etc. to ensure a reduced coverage compared to other UEs 115 that have a higher power level for transmitting uplink signals (e.g., uplink control information, uplink data).

Various aspects of the described techniques relate to configuring a UE 115 to manage cross-link interference. The UE 115 may be configured with multiple sensing resources. The UE 115 may also be configured with cross-link interference resources (e.g., time and frequency resources to be used by the UE 115 for measuring cross-link interference). The sensing resources and the cross-link interference resources may overlap in a time domain or a frequency domain, or both. If these resources do overlap, the UE 115 may perform cross-link interference measurements on the cross-link interference resources that overlap with the sensing resources. Otherwise, when cross-link interference resources do not overlap with the sensing resources, the UE 115 may avoid any cross-link interference measurements on those cross-link interference resources. Because the UE 115 is configured with multiple sensing resources, the UE 115 may be able to determine a sensing resource that is not subject to cross-link interference, and the UE 115 may report this to a network (e.g., a base station 105). The wireless communications system 100 may, as a result, include features for improvements to sensing and interference measurement operations by a UE 115 and, in some examples, may promote high reliability and low latency communications, among other benefits.

Figure 2:
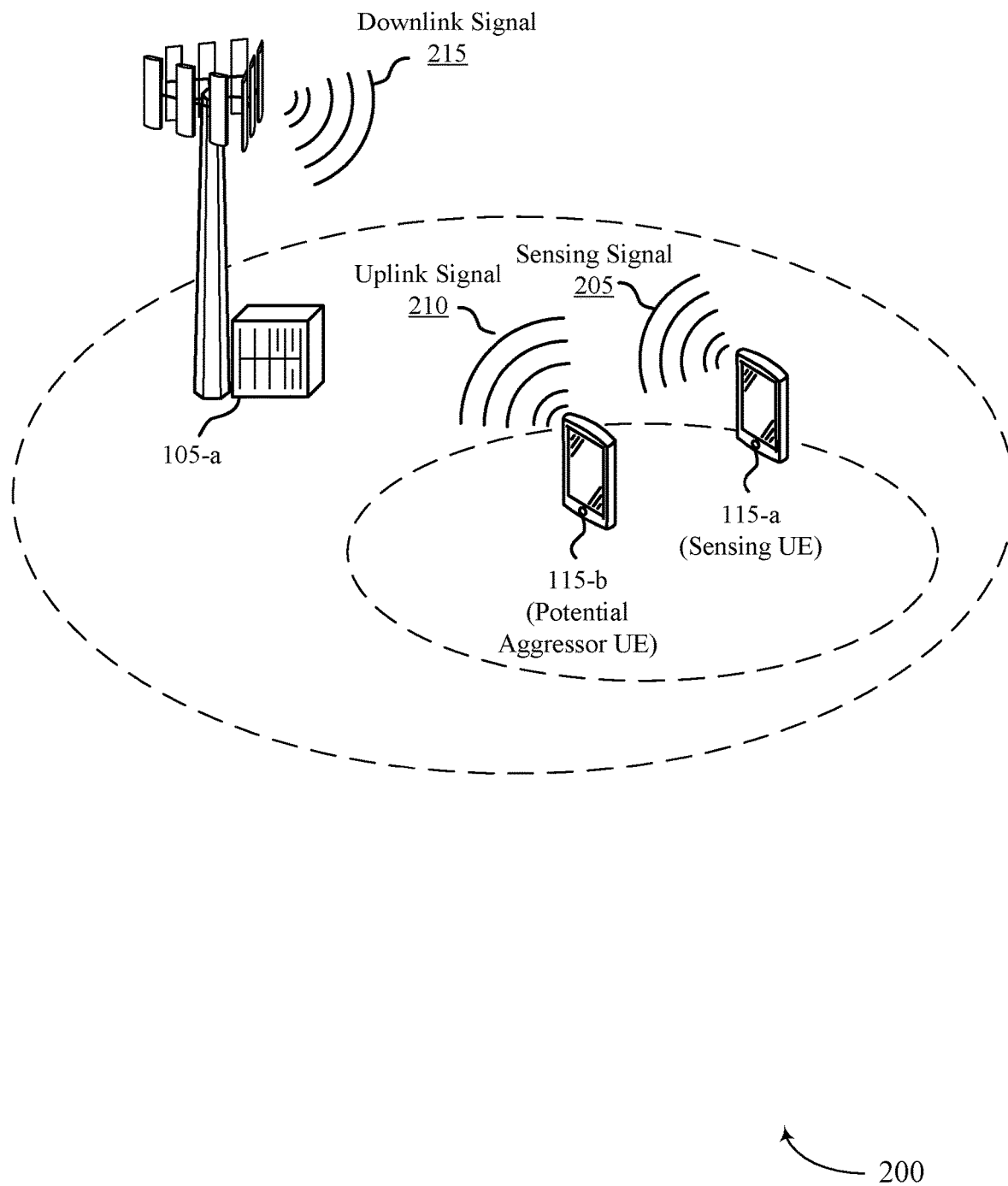

FIG. 2 illustrates an example of a wireless communications system 200 that supports interference measurement based on multiple sensing resource candidates in accordance with aspects of the present disclosure. The wireless communications system 200 may implement aspects of the wireless communications system 100. For example, the wireless communications system 200 may include a base station 105-a, a UE 115-a (also referred to as a sensing UE) and a UE 115-b (also referred to as an aggressor UE). The base station 105-a and the UEs 115-a, 115-b may be examples of a base station 105 and a UE 115 as described with reference to FIG. 1. In some examples, the wireless communications system 200 may support multiple radio access technologies including 4G systems such as LTE systems, LTE-A systems, or LTE-A Pro systems, and 5G systems which may be referred to as NR systems.

The base station 105-a and the UEs 115-a, 115-b may be configured with multiple antennas, which may be used to employ techniques such as transmit diversity, receive diversity, beamformed communications. The antennas of the base station 105-a and the UEs 115-a, 115-b may be located within one or more respective antenna arrays or antenna panels, which may support beamformed operations. For example, the base station 105-a antennas or antenna arrays may be co-located at an antenna assembly, such as an antenna tower. In some examples, antennas or antenna arrays associated with the base station 105-a may be located in diverse geographic locations. The base station 105-a may have an antenna array with a number of rows and columns of antenna ports that the base station 105-a may use to support beamforming of communications with the UEs 115-a, 115-b. Likewise, the UEs 115-a, 115-b may have one or more antenna arrays that may support various beamforming operations.

The base station 105-a and the UEs 115-a, 115-b may communicate via wireless communications using multiple component carriers. For example, the base station 105-a and the UEs 115-a, 115-b may be configured to support multiple downlink component carriers and multiple uplink component carriers. The base station 105-a and the UEs 115-a, 115-b may be configured to support the wireless communications over a carrier bandwidth or may be configured to support the wireless communications over one of multiple carrier bandwidths. The base station 105-a and the UEs 115-a, 115-b may support wireless communications over various communication links as described with reference to FIG. 1. For example, the base station 105-a may transmit downlink transmission via an access communication link (e.g., a Uu interface), and the UEs 115-a, 115-b may transmit uplink transmissions via an access communication link. Additionally the UEs 115-a, 115-b may transmit and receive sidelink transmissions over a sidelink (e.g., a PC5 interface).

In the example of FIG. 2, the UE 115-a may support various types of sensing applications that include transmission and reception of a sensing signal 205 (e.g., a radar sensing signal, a mmW sensing signal) as described herein. The UE 115-a may also be configured to transmit both data signals (e.g., uplink signals, sidelink signals) and sensing signals within a radio frequency spectrum band (or within a BWP) associated with the UE 115-a. However, because the UE 115-a transmits one or more sensing signals 205 within the radio frequency spectrum band (or within a BWP), the UE 115 may experience interference from the UE 115-b. For example, the UE 115-a may experience interference due to communications (e.g., an uplink signal 210) from the UE 115-b because both the UEs 115-a, 115-b may be proximate to each other. As such, the uplink signal 210 from the UE 115-b would cause an interference for reception of the sensing signal 205 at the UE 115-a.

To reduce or mitigate the interference at the UE 115-a due to communications (e.g., the uplink signal 210) from the UE 115-b, the base station 105-a may transmit, and the UE 115-a may receive, a downlink signal 215 carrying an allocation of a set of sensing resource candidates for sensing operations by the UE 115-a and a set of cross-link interference measurement resources. For example, the base station 105-a may transmit, and the UE 115-a may receive, on the downlink signal 215 an RRC configuration message (or a high layer message) that schedules the set of sensing resource candidates and the set of cross-link interference measurement resources. In some examples, the RRC configuration message may configure one or more sensing resource set identifiers. The RRC configuration message may also allocate a number of sensing resources per sensing resource set. The RRC configuration message may additionally, or alternatively, include one or more sensing resource parameters or sensing resource set parameters. For example, a sensing resource parameter or sensing resource set parameter may be an allocated BWP.

The RRC configuration message (or the high layer message) may, additionally, or alternatively, include other sensing resource related information to configure each sensing resource including a time and frequency resource pattern. For example, the UE 115-a may determine a time and frequency resource pattern associated with a sensing resource of a set of sensing resources on which the sensing signal 205 is received at the UE 115-a. In some examples, the UE 115-a may determine a subcarrier location associated with a sensing resource of a set of sensing resources on which the sensing signal 205 is received based on the time and frequency resource pattern associated with the sensing resource of the set of sensing resources. Additionally, or alternatively, the UE 115-a may determine a symbol location associated with a sensing resource of a set of sensing resources on which the sensing signal 205 is received at the UE 115-a. The UE 115-a may, in some other examples, determine a periodicity associated with a sensing resource of a set of sensing resources on which the sensing signal 205 is received at the UE 115-a. In other examples, the UE 115-a may determine an offset associated with a sensing resource of a set of sensing resources on which the sensing signal 205 is received at the UE 115-a.

The RRC configuration message (or the high layer message) may be configured with a field indication in the RRC configuration message (or the high layer message) indicating to the UE 115-a whether to transmit a measurement report to the base station 105-a associated with the UE 115-a measuring one or more cross-link interference measurement resources for a cross-link interference. For example, the RRC configuration message (or the high layer message) may have a measurement report field, and if the measurement report field has a bit value set to zero, the UE 115-a is not expected to report the cross-link interference measurement. Otherwise, if the measurement report field has a bit value set to one, the UE 115-a is expected to report the cross-link interference measurement to the base station 105-a. The UE 115-a may measure a signal strength metric associated with the sensing signal 205 on one or more cross-link interference measurement resources. For example, the UE 115-a may perform one or more measurements on the sensing signal 205 received at the UE 115-a, or the uplink signal 210 received at the UE 115-a, or both. The signal strength metric measurements may include RSSI measurements, RSRP measurements, reference signal received quality (RSRQ) measurements, SNR measurements, signal-to-interference plus noise (SINR) measurements, or any combination thereof.

The UE 115-a may be configured for each sensing resource of the set of sensing resources to perform the cross-link interference measurement on overlapping resources between one or more of the set of cross-link interference measurement resources that overlap with the sensing resource on which the sensing signal 205 is received at the UE 115-a. After measuring on multiple sensing resources, the UE 115-a may determine a best sensing resource to use for sensing operations and may provide an indication of the determined sensing resource (e.g., a sensing resource index) to the base station 105-a. For example, the UE 115-a may determine the sensing resource satisfies a threshold for sensing the sensing signal 205 based on measuring the one or more cross-link interference measurement resources for the cross-link interference, and the UE 115-a may transmit, to the base station 105-a, an indication of a resource index associated with the sensing resource.

The UE 115-a may operate in a half duplex mode or a full duplex mode. In some examples, the UE 115-a may assign a timestamp associated with reception of the sensing signal 205 at the UE 115-a based on which duplex mode the UE 115-a is operating in. For full duplex mode, the UE 115-a may determine a maximum sensing range to use to determine a time duration of the received sensing signal 205, while for half duplex mode, the UE 115-a may determine a maximum or a minimum sensing range to use to determine a time duration of the received sensing signal 205. Thus, the time duration of the received sensing signal 205 at the UE 115-a can be the same as the time duration of the transmitted sensing signal 205 by the UE 115-a.

Accordingly, because the UE 115-a in the wireless communications system 200 is configured with multiple sensing resources, the UE 115-a may be able to determine a sensing resource that is not subject to cross-link interference, and the UE 115-a may report this to the base station 105-a. The described techniques may, as a result, include features for improvements to sensing and interference measurement operations and, in some examples, may promote high reliability and low latency communications, among other benefits.

Figure 3:
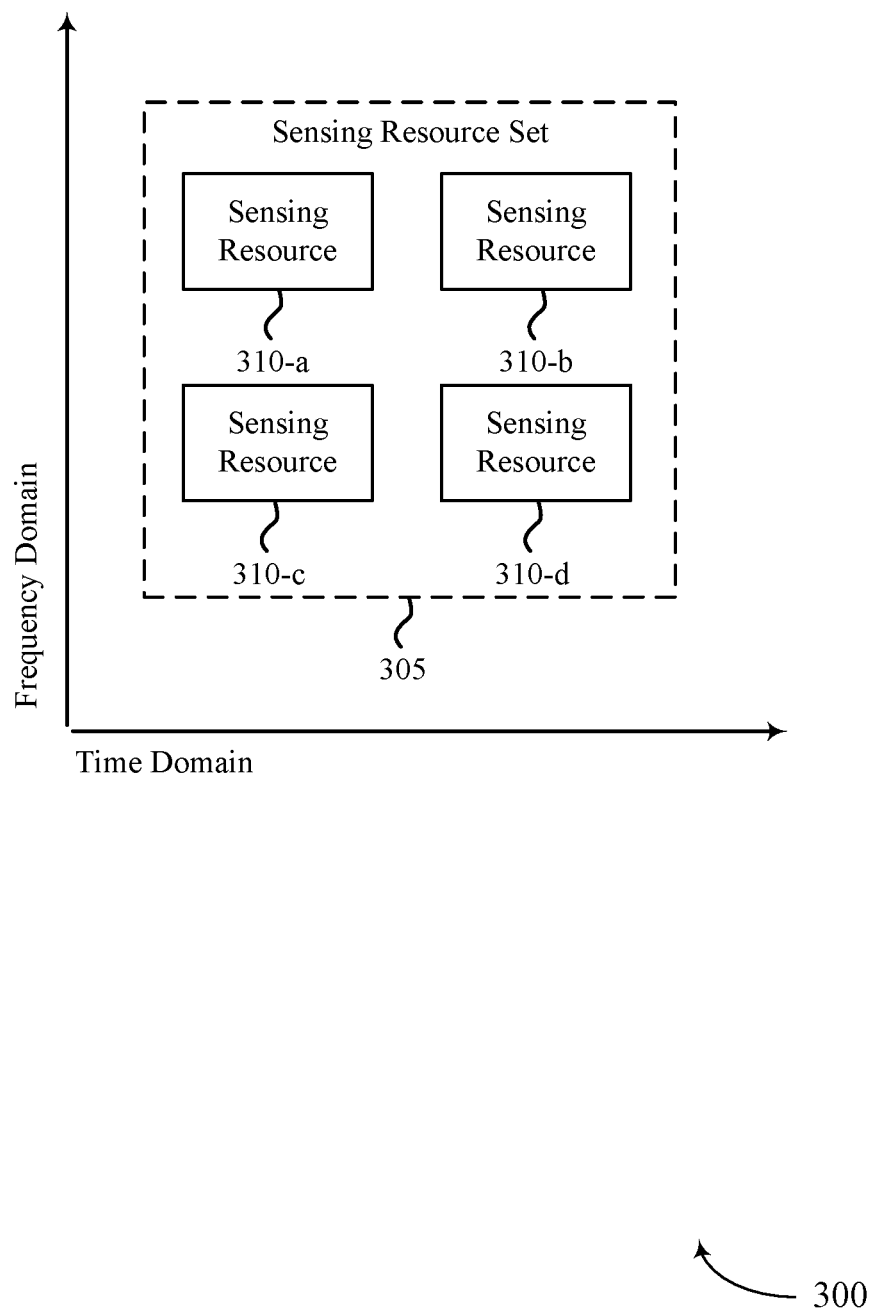
FIGS. 3 and 4 illustrates examples of resource configurations that support interference measurement based on multiple sensing resource candidates in accordance with aspects of the present disclosure.

FIG. 3 illustrates an example of a resource configuration 300 that supports interference measurement based on multiple sensing resource candidates in accordance with aspects of the present disclosure. The resource configuration 300 may implement aspects of the wireless communications system 200. For example, the resource configuration 300 may be based on a configuration by a base station 105 and implemented by a UE 115 to promote power saving for the UE 115 by supporting interference measurement operations based on multiple sensing resource candidates. The resource configuration 300 may also be based on a configuration by a base station 105 and implemented by a UE 115 to achieve higher reliability for sensing operations by supporting interference measurement operations based on multiple sensing resource candidates.

In the example of FIG. 3, the resource configuration 300 may include at least one sensing resource set 305 including multiple sensing resources 310. As described with reference to FIG. 2, the sensing resource set 305 may be configured according to a time and frequency resource pattern, and thereby each sensing resource 310 may be configured (e.g., allocated) in accordance with the time and frequency resource pattern. A sensing resource 310 may be a resource in a time domain or a frequency domain, or both. For example, a sensing resource 310 may be a symbol period, a minislot, a subframe, or a frame in a time domain. Likewise, a sensing resource 310 may be a subcarrier or a carrier in a frequency domain. The UE 115 may use one or more sensing resources 310 for sensing operations related to sensing applications (e.g., hand gesture applications, multi-dimensional imaging application, virtual reality applications, beam tracking applications, localization applications, and the like).

The base station 105 may, in some examples, assign a subcarrier location with each sensing resource 310 of the sensing resource set 305, and the UE 115 may determine the subcarrier location for each sensing resource 310, as described with reference to FIG. 2 (e.g., via a higher layer message). In some other examples, the base station 105 may assign a symbol location associated with each sensing resource 310 of the sensing resource set 305, and the UE 115 may determine the symbol location for each sensing resource 310, as described with reference to FIG. 2 (e.g., via a higher layer message). Multiple sensing resources 310 may correspond to a same subcarrier location but different symbol locations. For example, sensing resource 310-*a* and sensing resource 310-*b* have a same subcarrier location in a frequency domain and different symbol locations in a time domain. Likewise, sensing resource 310-*c* and sensing resource 310-*d* have a same subcarrier location in a frequency domain but different symbol locations in a time domain.

Multiple sensing resources 310 may correspond to different subcarrier locations but same symbol locations. For example, sensing resource 310-*a* and sensing resource 310-*c* have different subcarrier locations in a frequency domain but same symbol locations in a time domain. Likewise, sensing resource 310-*b* and sensing resource 310-*d* may correspond to different subcarrier locations in a frequency domain and have same symbol locations in a time domain. The base station 105 may also assign a periodicity or an offset (e.g., a subcarrier spacing) with each sensing resource 310 of the sensing resource set 305, and the UE 115 may determine the periodicity or the offset, or both, for each sensing resource 310, as described with reference to FIG. 2 (e.g., via a higher layer message). That is, each sensing resource 310 may occupy particular time and frequency resources of the sensing resource set 305 based on the periodicity or the offset, or both. For example, sensing resources 310 may be spaced part in the sensing resource set 305 based on the offset, as such the sensing resources 310 may be noncontiguous in a time domain or a frequency domain, or both. In other examples, the two or more sensing resources 310 may be contiguous in a time domain or a frequency domain, or both.

Therefore, as described with reference to FIG. 2, because the UE 115 is configured with multiple sensing resources 310, the UE 115 may be able to determine a sensing resource 310 that is not subject to cross-link interference, and the UE 115 may report this to the base station 105. The UE 115 may thereby select a sensing resource 310 based on cross-link interference measurement.

Figure 4:
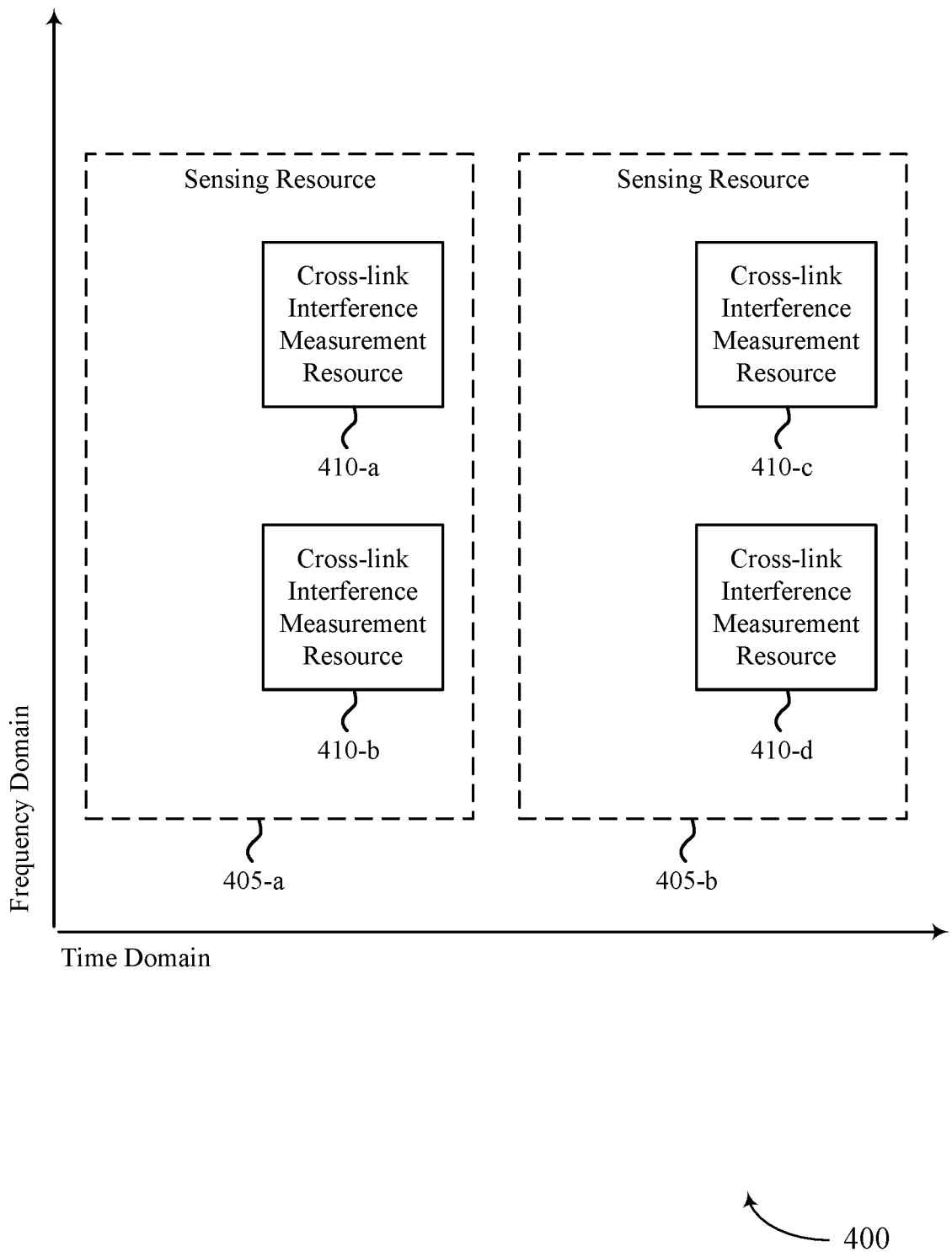

FIG. 4 illustrates an example of a resource configuration 400 that supports interference measurement based on multiple sensing resource candidates in accordance with aspects of the present disclosure. The resource configuration 400 may implement aspects of the wireless communications system 200. For example, the resource configuration 400 may be based on a configuration by a base station 105 and implemented by a UE 115 to promote power saving for the UE 115 by supporting interference measurement operations based on multiple sensing resource candidates. The resource configuration 400 may also be based on a configuration by a base station 105 and implemented by a UE 115 to achieve higher reliability for sensing operations by supporting interference measurement operations based on multiple sensing resource candidates.

In the example of FIG. 4, the resource configuration 400 may include multiple sensing resources 405 and multiple cross-link interference measurement resources 410. The UE 115 may use one or more sensing resources 405 for sensing operations related to sensing applications (e.g., hand gesture applications, multi-dimensional imaging application, virtual reality applications, beam tracking applications, localization applications, and the like). The UE 115 may use one or more cross-link interference measurement resources 410 to measure a cross-link interference experienced at the UE 115 or caused by the UE 115. A sensing resource 405 and a cross-link interference measurement resource 410 may be a resource in a time domain or a frequency domain, or both. For example, a sensing resource 405 and a cross-link interference measurement resource 410 may be a symbol period, a minislot, a subframe, or a frame in a time domain. Likewise, a sensing resource 405 and a cross-link interference measurement resource 410 may be a subcarrier or a carrier in a frequency domain.

As described with reference to FIG. 2, the UE 115 may be configured for each sensing resource 405 to perform cross-link interference measurement on overlapping resources between a cross-link interference measurement resource 410 that overlaps with a sensing resource 405 on which a sensing signal is received at the UE 115. For example, the UE 115 may measure cross-link interference measurement resources 410-*a*, 410-*b* for the sensing resource 405-*a* because the cross-link interference measurement resources 410-*a*, 410-*b* overlap with the sensing resource 405-*a* in a time domain or a frequency domain, or both. Likewise, the UE 115 may measure cross-link interference measurement resources 410-*c*, 410-*d* for the sensing resource 405-*b* because the cross-link interference measurement resources 410-*c*, 410-*d* overlap with the sensing resource 405-*a* in a time domain or a frequency domain, or both.

Figure 5:
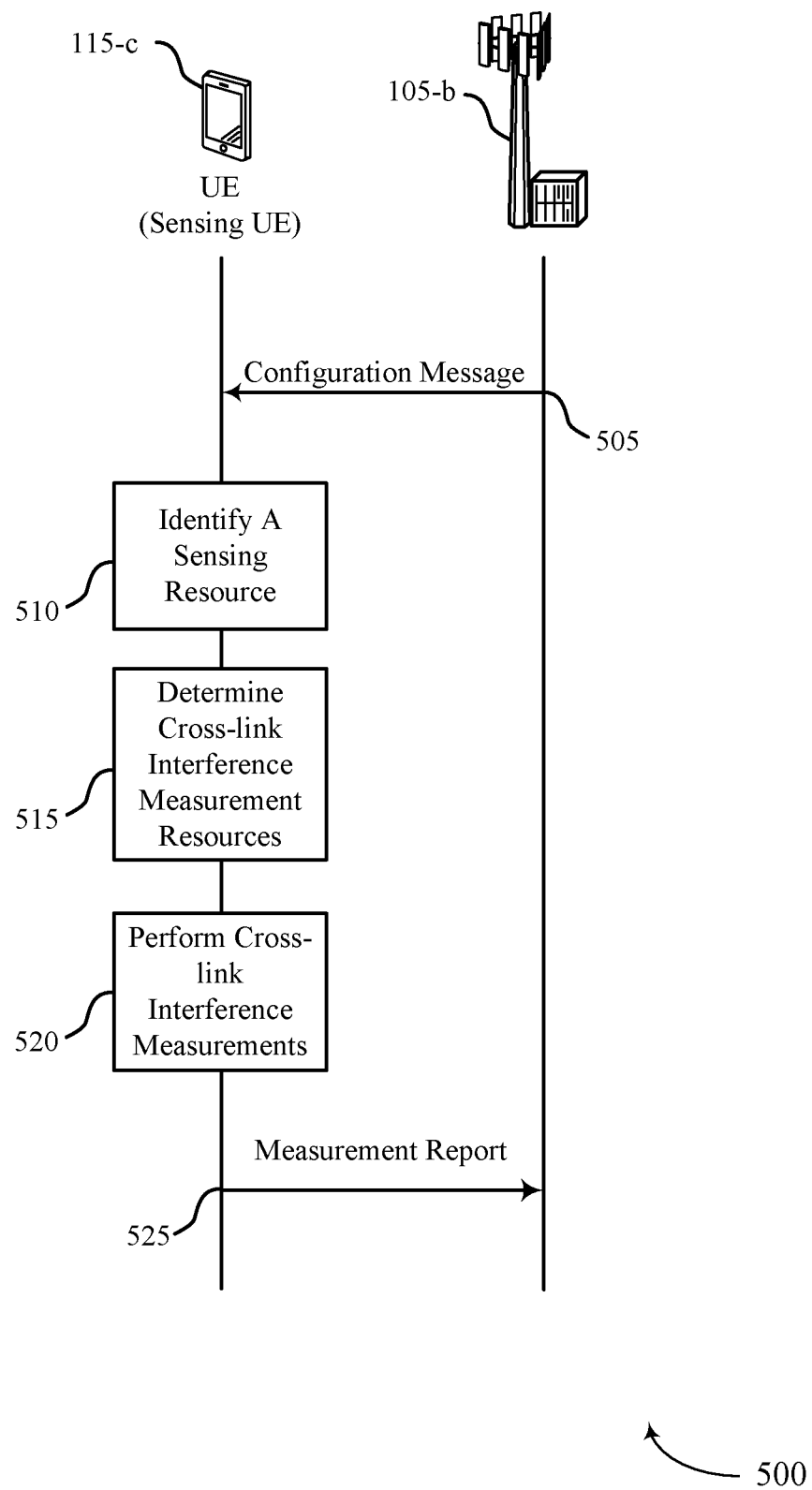
FIG. 5 illustrates an example of a process flow that supports interference measurement based on multiple sensing resource candidates in accordance with aspects of the present disclosure.

FIG. 5 illustrates an example of a process flow 500 that supports interference measurement based on multiple sensing resource candidates in accordance with aspects of the present disclosure. The process flow 500 may implement aspects of the wireless communications system 100 and 200 described with reference to FIGS. 1 and 2, respectively. The process flow 500 may be based on a configuration by a base station 105-*b*, and implemented by a UE 115-*c* (also referred to as a sensing UE) to promote power saving for the UEs 115-*c* by supporting interference measurement operations based on multiple sensing resource candidates. The process flow 500 may be based on a configuration by the base station 105-*b* and implemented by the UE 115-*c* to achieve higher reliability for sensing operations by supporting interference measurement operations based on multiple sensing resource candidates, among other benefits.

The base station 105-*b* and the UE 115-*c* may be examples of a base station 105 and a UE 115, as described herein. In the following description of the process flow 500, the operations between the base station 105-*b* and the UE 115-*c* may be transmitted in a different order than the example order shown, or the operations performed by the base station 105-*b* and the UE 115-*c* may be performed in different orders or at different times. The operations illustrated in the process flow 500 may be performed by hardware (e.g., including circuitry, processing blocks, logic components, and other components), code (e.g., software or firmware) executed by a processor, or any combination thereof, of the base station 105-*b* and the UE 115-*c*. Some operations may also be omitted from the process flow 500, and other operations may be added to the process flow 500.

At 505, the base station 105-*b* may transmit a configuration message, for example, an RRC configuration message to the UE 115-*c*. The configuration message may allocate a set of sensing resources and a set of cross-link interference measurement resources associated with the set of sensing resources, as well as an indication for the UE 115-*c* to measure one or more cross-link interference measurement resources for cross-link interference based on the one or more cross-link interference measurement resources overlapping with a sensing resource of the set of sensing resources. At 510, the UE 115-*c* may identify a sensing resource of the set of sensing resources on which a sensing signal is received. At 515, the UE 115-*c* may determine one or more cross-link interference measurement resources that overlap with the sensing resource. The cross-link interference measurement resources may be associated with signals (e.g., sensing signals, uplink signals, reference signals, sidelink signals) transmitted by the UE 115 *c* or other UEs 115. At 520, the UE 115-*c* may perform a cross-link interference measurement by measuring the one or more cross-link interference measurement resources that overlap with the sensing resource. For example, the UE 115-*c* may perform RSSI measurements, RSRP measurements, RSRQ measurements, SNR measurements, SINR measurements, or any combination thereof. At 525, the UE 115-*c* may transmit a measurement report to the base station 105-*b*, which may indicate the measured cross-link interference as described with reference to FIG. 2.

Figure 6:
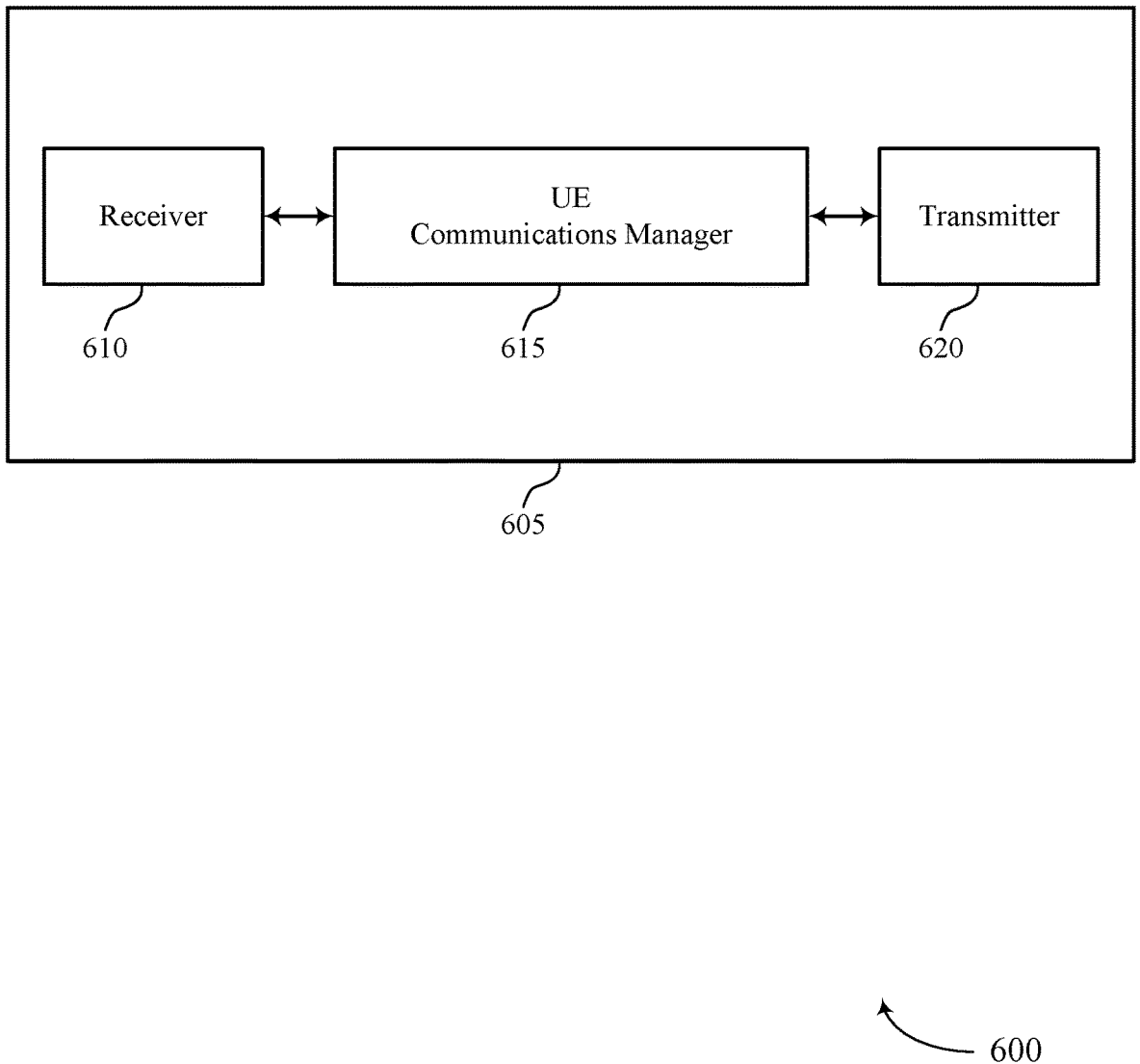
FIGS. 6 and 7 show block diagrams of devices that support interference measurement based on multiple sensing resource candidates in accordance with aspects of the present disclosure.

FIG. 6 shows a block diagram 600 of a device 605 that supports interference measurement based on multiple sensing resource candidates in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to interference measurement based on multiple sensing resource candidates, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive an allocation of a set of sensing resources and a set of cross-link interference measurement resources, identify a sensing resource of the set of sensing resources on which a sensing signal is received, determine one or more of the set of cross-link interference measurement resources that overlap with the sensing resource, and measure the one or more cross-link interference measurement resources for cross-link interference based on the one or more cross-link interference measurement resources overlapping with the sensing resource. The UE communications manager 615 may be an example of aspects of the UE communications manager 910 described herein.

The UE communications manager 615 may enable the device 605 to provide enhanced interference measurement based on multiple sensing resource candidates. In some implementations, the UE communications manager 615 may enable the device 605 to determine one or more of the set of cross-link interference measurement resources that overlap with the sensing resource. Based on implementing this determination, one or more processors of the device 605 (e.g., processor(s) controlling or incorporated with the UE communications manager 615) may measure the one or more cross-link interference measurement resources for cross-link interference, and thereby experience reduce power consumption and promote high reliability and low latency sensing operations (e.g., for gesture applications, multi-dimensional imaging application, virtual reality applications, beam tracking applications, localization applications, and the like), among other benefits by selecting a sensing resource to use for the sensing operations based on the cross-link interference measurement.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
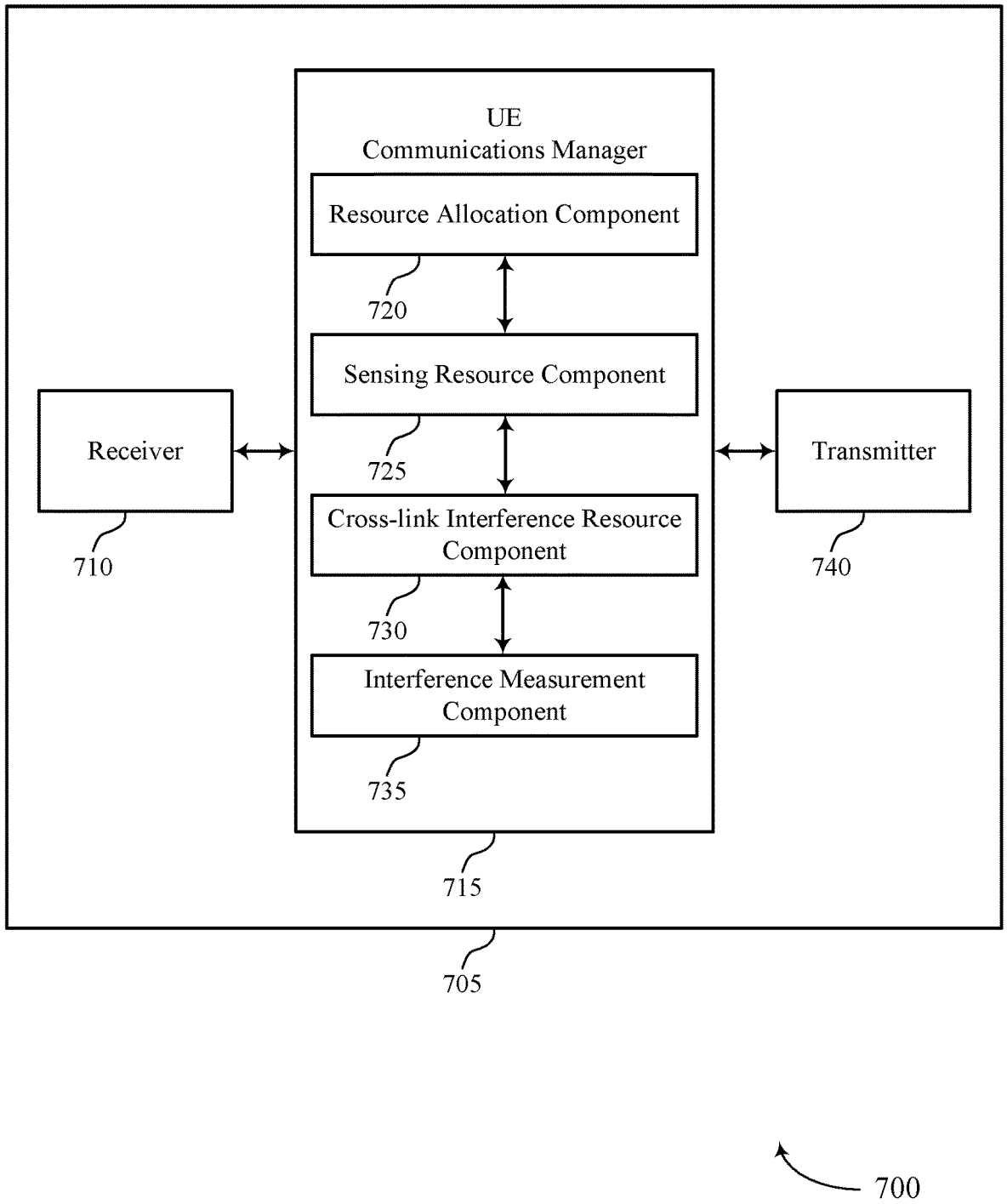

FIG. 7 shows a block diagram 700 of a device 705 that supports interference measurement based on multiple sensing resource candidates in accordance with aspects of the present disclosure. The device 705 may be an example of aspects of a device 605, or a UE 115 as described herein. The device 705 may include a receiver 710, a UE communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to interference measurement based on multiple sensing resource candidates, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a resource allocation component 720, a sensing resource component 725, a cross-link interference resource component 730, and an interference measurement component 735. The UE communications manager 715 may be an example of aspects of the UE communications manager 910 described herein.

The resource allocation component 720 may receive an allocation of a set of sensing resources and a set of cross-link interference measurement resources. The sensing resource component 725 may identify a sensing resource of the set of sensing resources on which a sensing signal is received. The cross-link interference resource component 730 may determine one or more of the set of cross-link interference measurement resources that overlap with the sensing resource. The interference measurement component 735 may measure the one or more cross-link interference measurement resources for cross-link interference based on the one or more cross-link interference measurement resources overlapping with the sensing resource.

The transmitter 740 may transmit signals generated by other components of the device 705. In some examples, the transmitter 740 may be collocated with a receiver 710 in a transceiver component. For example, the transmitter 740 may be an example of aspects of the transceiver 920 described with reference to FIG. 9. The transmitter 740 may utilize a single antenna or a set of antennas.

Figure 8:
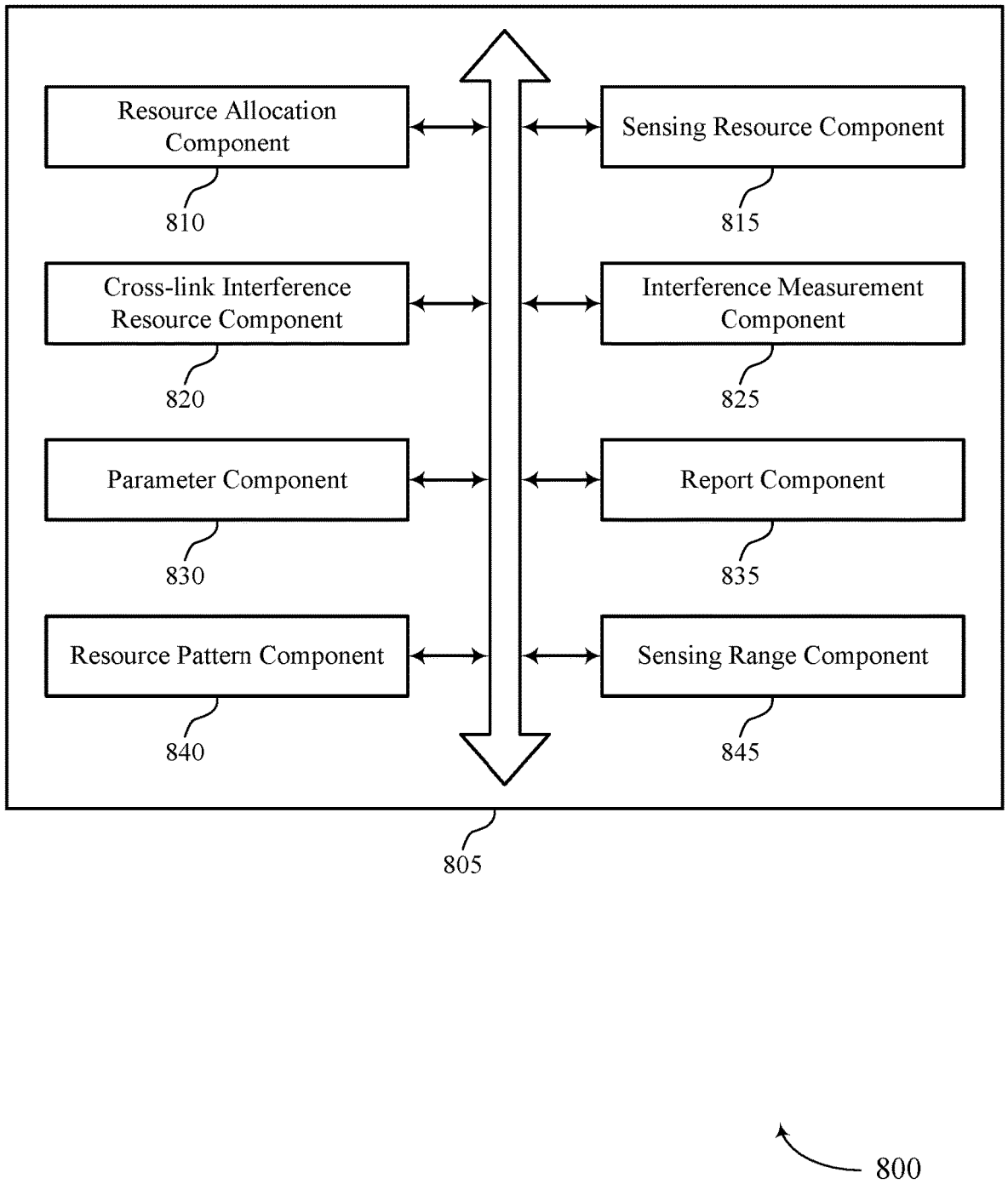
FIG. 8 shows a block diagram of a UE communications manager that supports interference measurement based on multiple sensing resource candidates in accordance with aspects of the present disclosure.

FIG. 8 shows a block diagram 800 of a UE communications manager 805 that supports interference measurement based on multiple sensing resource candidates in accordance with aspects of the present disclosure. The UE communications manager 805 may be an example of aspects of a UE communications manager 615, a UE communications manager 715, or a UE communications manager 910 described herein. The UE communications manager 805 may include a resource allocation component 810, a sensing resource component 815, a cross-link interference resource component 820, an interference measurement component 825, a parameter component 830, a report component 835, a resource pattern component 840, and a sensing range component 845. Each of these components may communicate, directly or indirectly, with one another (e.g., via one or more buses).

The resource allocation component 810 may receive an allocation of a set of sensing resources and a set of cross-link interference measurement resources. In some examples, the resource allocation component 810 may receive, from a base station, an RRC configuration message including the allocation of the set of sensing resources and the set of cross-link interference measurement resources. The sensing resource component 815 may identify a sensing resource of the set of sensing resources on which a sensing signal is received. In some examples, the sensing resource component 815 may receive a configuration which includes a set of sensing resource identifiers. In some examples, the sensing resource component 815 may determine the set of sensing resources based on the set of sensing resource identifiers.

The sensing resource component 815 may receive a configuration that identifies the sensing resource from the set of sensing resources. In some examples, the sensing resource component 815 may determine the sensing resource of the set of sensing resources satisfies a threshold for sensing the sensing signal based on measuring the one or more cross-link interference measurement resources for the cross-link interference. In some examples, the sensing resource component 815 may transmit, to the base station, an indication of a resource index associated with the sensing resource.

The cross-link interference resource component 820 may determine one or more of the set of cross-link interference measurement resources that overlap with the sensing resource. The interference measurement component 825 may measure the one or more cross-link interference measurement resources for cross-link interference based on the one or more cross-link interference measurement resources overlapping with the sensing resource. In some examples, the interference measurement component 825 may measure a signal strength metric associated with the sensing signal on the one or more cross-link interference measurement resources, the signal strength metric including an RSRP or an RSSI, or both.

The parameter component 830 may identify a set of sensing parameters associated with the set of sensing resources, where at least one sensing parameter of the set of sensing parameters includes a BWP. The report component 835 may determine to transmit a measurement report based on an indication received in an RRC configuration message allocating the set of cross-link interference measurement resources. In some examples, the report component 835 may transmit the measurement report associated with the one or more measured cross-link interference measurement resources for the cross-link interference based on the indication. In some examples, the report component 835 may determine to refrain from transmitting a measurement report based on an indication received in an RRC configuration message allocating the set of cross-link interference measurement resources. In some examples, the report component 835 may refrain from transmitting the measurement report associated with the one or more measured cross-link interference measurement resources for the cross-link interference based on the indication.

The resource pattern component 840 may determine a time and frequency resource pattern associated with the sensing resource of the set of sensing resources on which a sensing signal is received. In some examples, the resource pattern component 840 may determine a subcarrier location associated with the sensing resource of the set of sensing resources on which a sensing signal is received based on the time and frequency resource pattern associated with the sensing resource of the set of sensing resources. In some examples, the resource pattern component 840 may determine a symbol location associated with the sensing resource of the set of sensing resources on which a sensing signal is received based on the time and frequency resource pattern associated with the sensing resource of the set of sensing resources. In some examples, the resource pattern component 840 may determine a periodicity associated with the sensing resource of the set of sensing resources on which a sensing signal is received based on the time and frequency resource pattern associated with the sensing resource of the set of sensing resources. In some examples, the resource pattern component 840 may determine an offset associated with the sensing resource of the set of sensing resources on which a sensing signal is received based on the time and frequency resource pattern associated with the sensing resource of the set of sensing resources.

The sensing range component 845 may determine a maximum sensing range to use to determine a duration associated with the sensing signal based on the UE operating in a full-duplex mode. In some examples, the sensing range component 845 may determine the duration associated with the sensing signal using the maximum sensing range, where measuring the one or more cross-link interference measurement resources for the cross-link interference is based on the duration associated with the sensing signal. In some examples, the sensing range component 845 may determine a minimum sensing range to use to determine a duration associated with the sensing signal based on the UE operating in a half-duplex mode. In some examples, the sensing range component 845 may determine the duration associated with the sensing signal using the minimum sensing range, where measuring the one or more cross-link interference measurement resources for the cross-link interference is based on the duration associated with the sensing signal.

Figure 9:
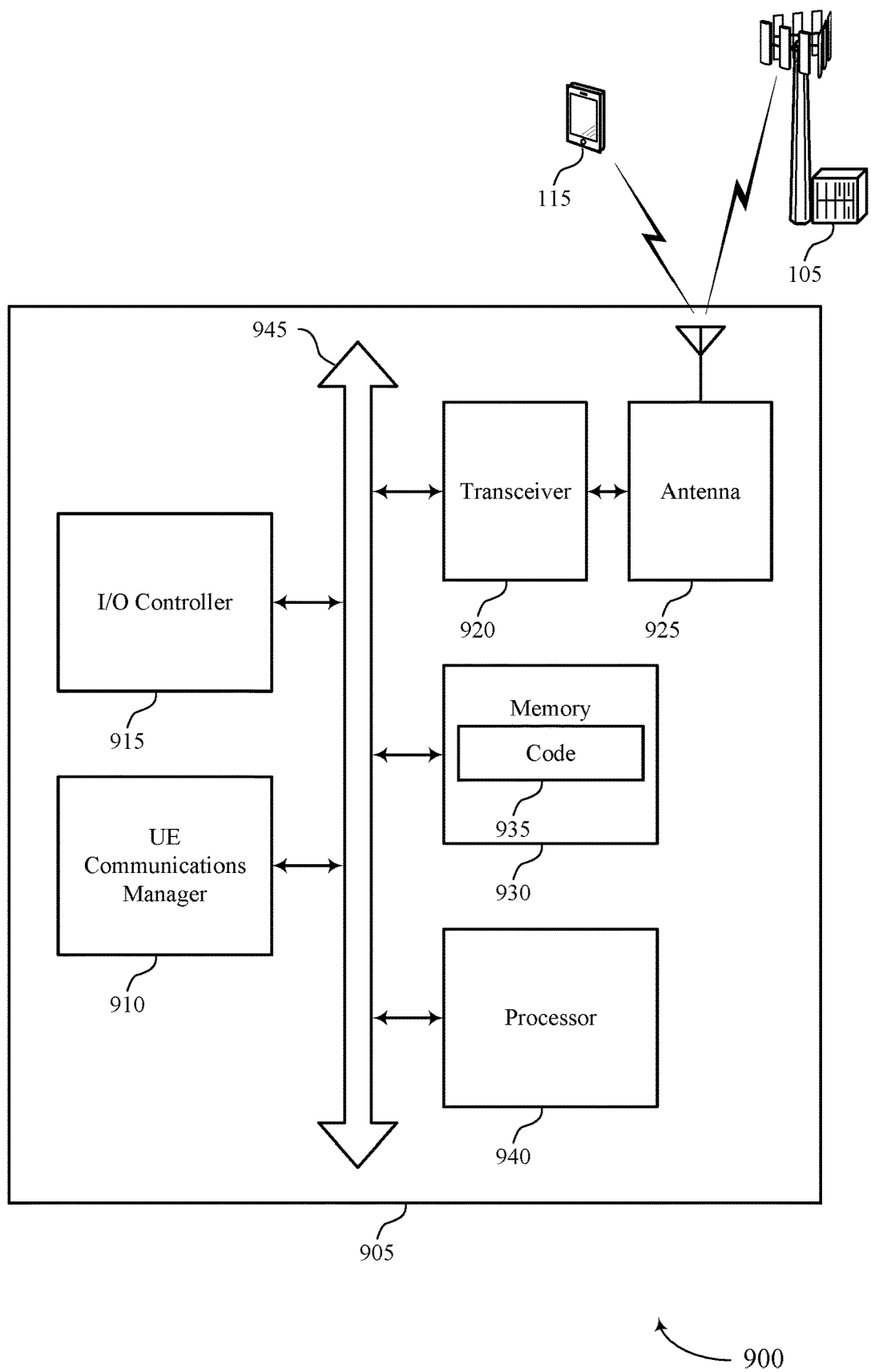
FIG. 9 shows a diagram of a system including a device that supports interference measurement based on multiple sensing resource candidates in accordance with aspects of the present disclosure.

FIG. 9 shows a diagram of a system 900 including a device 905 that supports interference measurement based on multiple sensing resource candidates in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive an allocation of a set of sensing resources and a set of cross-link interference measurement resources, identify a sensing resource of the set of sensing resources on which a sensing signal is received, determine one or more of the set of cross-link interference measurement resources that overlap with the sensing resource, and measure the one or more cross-link interference measurement resources for cross-link interference based on the one or more cross-link interference measurement resources overlapping with the sensing resource.

The UE communications manager 910 may enable the device 905 to provide enhanced interference measurement based on multiple sensing resource candidates. In some implementations, the UE communications manager 910 may enable the device 905 to determine one or more of the set of cross-link interference measurement resources that overlap with the sensing resource. Based on implementing this determination, one or more processors of the device 905 (e.g., processor(s) controlling or incorporated with the UE communications manager 910) may measure the one or more cross-link interference measurement resources for cross-link interference, and thereby reduce power consumption and promote high reliability sensing operations (e.g., for gesture applications, multi-dimensional imaging application, virtual reality applications, beam tracking applications, localization applications, and the like), among other benefits by selecting a sensing resource to use for the sensing operations based on the cross-link interference measurement.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases, the device 905 may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor 940 to perform various functions described herein. In some cases, the memory 930 may contain, among other things, a basic input/output system (BIOS) which may control basic hardware or software operation such as the interaction with peripheral components or devices. The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting interference measurement based on multiple sensing resource candidates).

Figure 10:
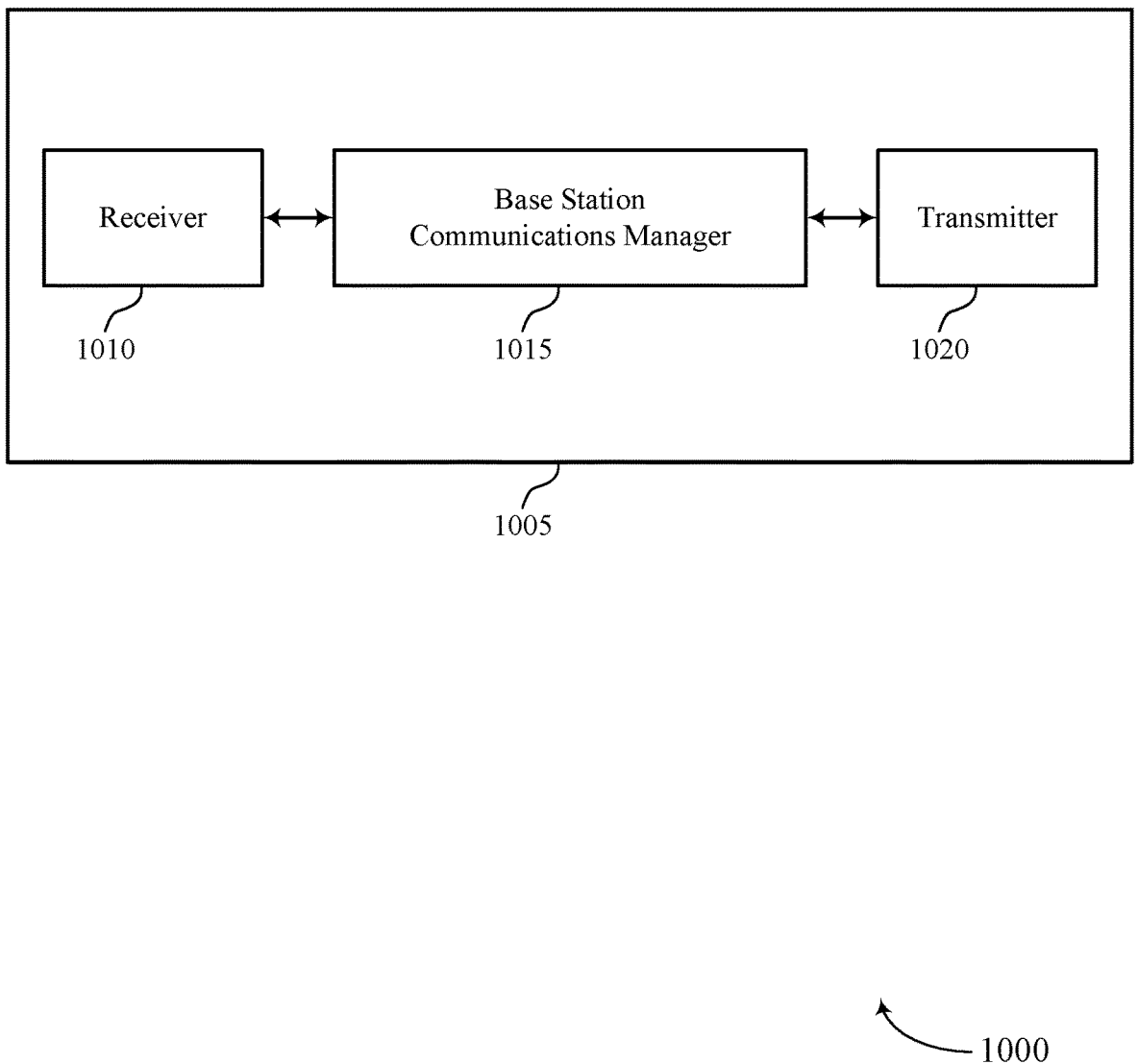
FIGS. 10 and 11 show block diagrams of devices that support interference measurement based on multiple sensing resource candidates in accordance with aspects of the present disclosure.

FIG. 10 shows a block diagram 1000 of a device 1005 that supports interference measurement based on multiple sensing resource candidates in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to interference measurement based on multiple sensing resource candidates, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may determine an allocation of a set of sensing resources and a set of cross-link interference measurement resources and transmit, to a UE a configuration message including the allocation of the set of sensing resources and the set of cross-link interference measurement resources associated with the set of sensing resources, and an indication to measure one or more cross-link interference measurement resources for cross-link interference based on the one or more cross-link interference measurement resources overlapping with a sensing resource of the set of sensing resources. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
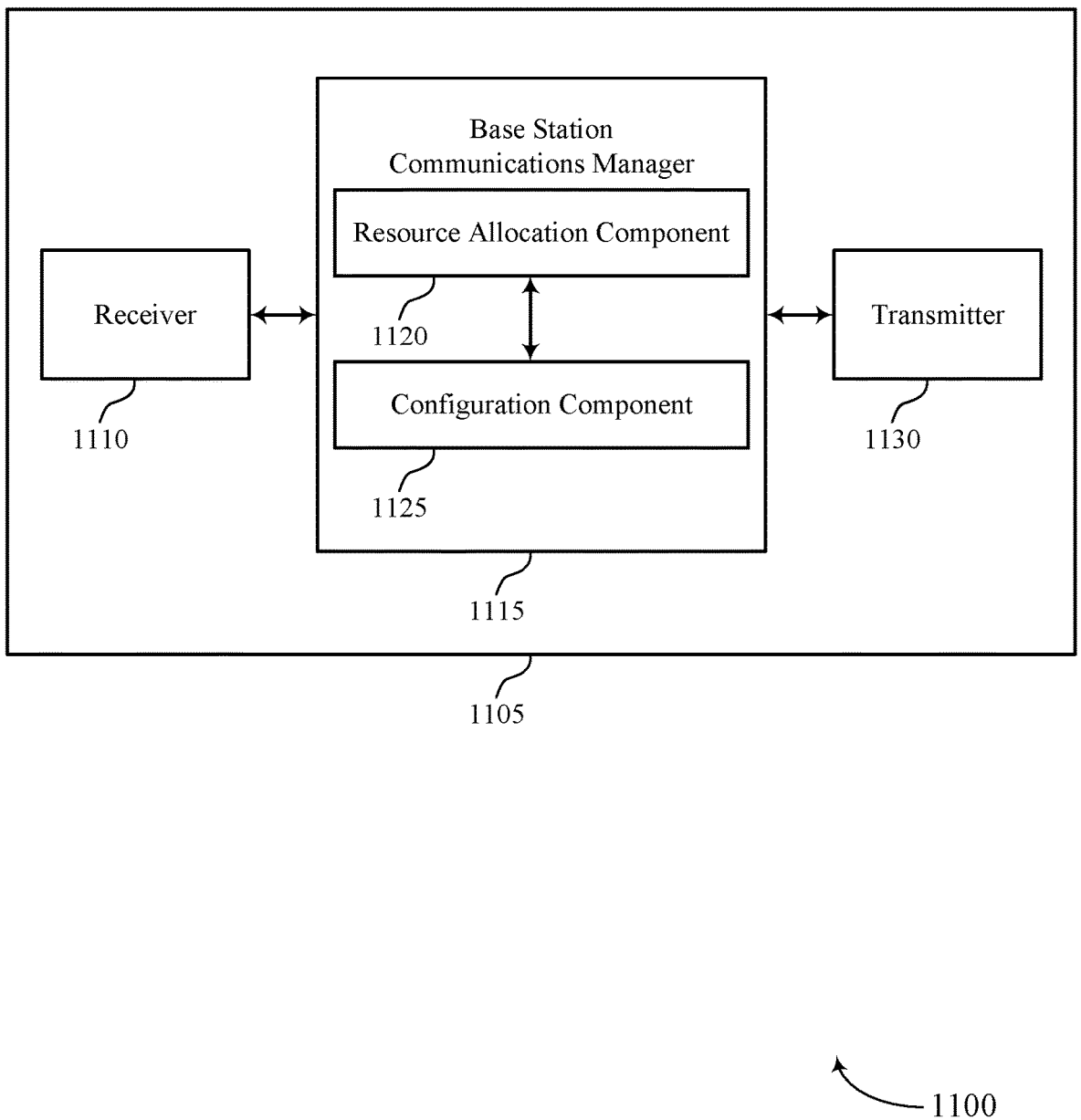

FIG. 11 shows a block diagram 1100 of a device 1105 that supports interference measurement based on multiple sensing resource candidates in accordance with aspects of the present disclosure. The device 1105 may be an example of aspects of a device 1005, or a base station 105 as described herein. The device 1105 may include a receiver 1110, a base station communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to interference measurement based on multiple sensing resource candidates, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a resource allocation component 1120 and a configuration component 1125. The base station communications manager 1115 may be an example of aspects of the base station communications manager 1310 described herein.

The resource allocation component 1120 may determine an allocation of a set of sensing resources and a set of cross-link interference measurement resources. The configuration component 1125 may transmit, to a UE a configuration message including the allocation of the set of sensing resources and the set of cross-link interference measurement resources associated with the set of sensing resources, and an indication to measure one or more cross-link interference measurement resources for cross-link interference based on the one or more cross-link interference measurement resources overlapping with a sensing resource of the set of sensing resources.

The transmitter 1130 may transmit signals generated by other components of the device 1105. In some examples, the transmitter 1130 may be collocated with a receiver 1110 in a transceiver component. For example, the transmitter 1130 may be an example of aspects of the transceiver 1320 described with reference to FIG. 13. The transmitter 1130 may utilize a single antenna or a set of antennas.

Figure 12:
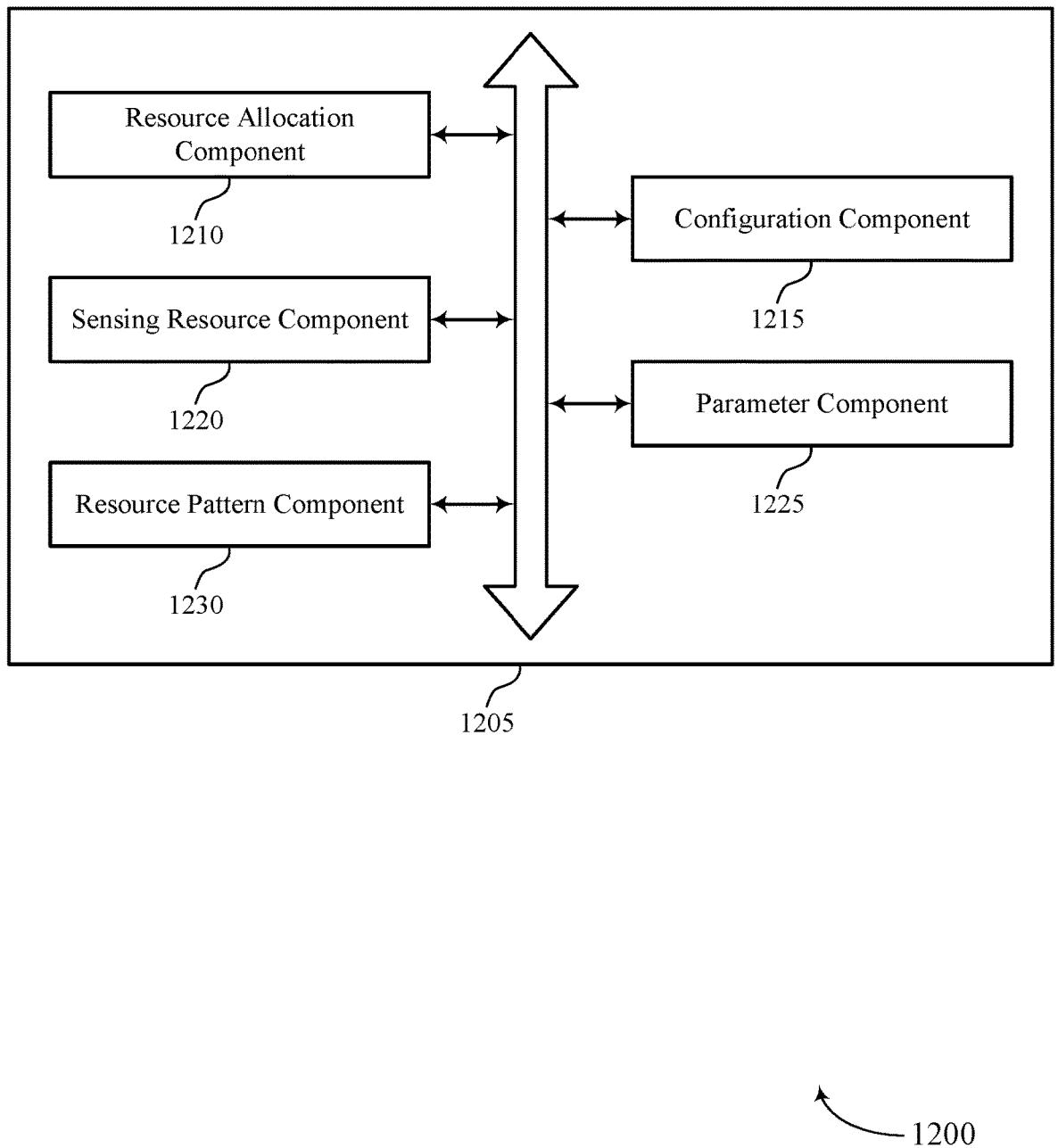
FIG. 12 shows a block diagram of a base station communications manager that supports interference measurement based on multiple sensing resource candidates in accordance with aspects of the present disclosure.

FIG. 12 shows a block diagram 1200 of a base station communications manager 1205 that supports interference measurement based on multiple sensing resource candidates in accordance with aspects of the present disclosure. The base station communications manager 1205 may be an example of aspects of a base station communications manager 1015, a base station communications manager 1115, or a base station communications manager 1310 described herein. The base station communications manager 1205 may include a resource allocation component 1210, a configuration component 1215, a sensing resource component 1220, a parameter component 1225, and a resource pattern component 1230. Each of these components may communicate, directly or indirectly, with one another (e.g., via one or more buses).

The resource allocation component 1210 may determine an allocation of a set of sensing resources and a set of cross-link interference measurement resources. The configuration component 1215 may transmit, to a UE a configuration message including the allocation of the set of sensing resources and the set of cross-link interference measurement resources associated with the set of sensing resources, and an indication to measure one or more cross-link interference measurement resources for cross-link interference based on the one or more cross-link interference measurement resources overlapping with a sensing resource of the set of sensing resources. In some cases, the configuration message includes an indication to the UE whether to transmit a measurement report to the base station associated with the UE measuring the one or more cross-link interference measurement resources for the cross-link interference based on the one or more cross-link interference measurement resources overlapping with the sensing resource of the set of sensing resources. In some cases, the configuration message includes a high layer message. In some cases, the higher layer message includes an RRC message.

The sensing resource component 1220 may transmit a set of sensing resource identifiers associated with the set of sensing resources in the configuration message. In some examples, the sensing resource component 1220 may include, in the configuration message, an identifier which identifies the sensing resource from the set of sensing resources. The parameter component 1225 may transmit a set of sensing parameters associated with the set of sensing resources in the configuration message. In some cases, at least one sensing parameter of the set of sensing parameters includes a BWP.

The resource pattern component 1230 may assign a time and frequency resource pattern associated with the set of sensing resources, where the configuration message includes an indication of the time and frequency resource pattern associated with the set of sensing resources. In some examples, the resource pattern component 1230 may assign a subcarrier location associated with each sensing resource of the set of sensing resources, where the configuration message includes an indication of the subcarrier location associated with each sensing resource of the set of sensing resources. In some examples, the resource pattern component 1230 may assign a symbol location associated with each sensing resource of the set of sensing resources, where the configuration message includes an indication of the symbol location associated with each sensing resource of the set of sensing resources.

The resource pattern component 1230 may assign a periodicity associated with each sensing resource of the set of sensing resources, where the configuration message includes an indication of the periodicity associated with each sensing resource of the set of sensing resources. In some examples, the resource pattern component 1230 may assign an offset associated with each sensing resource of the set of sensing resources, where the configuration message includes an indication of the offset associated with each sensing resource of the set of sensing resources.

Figure 13:
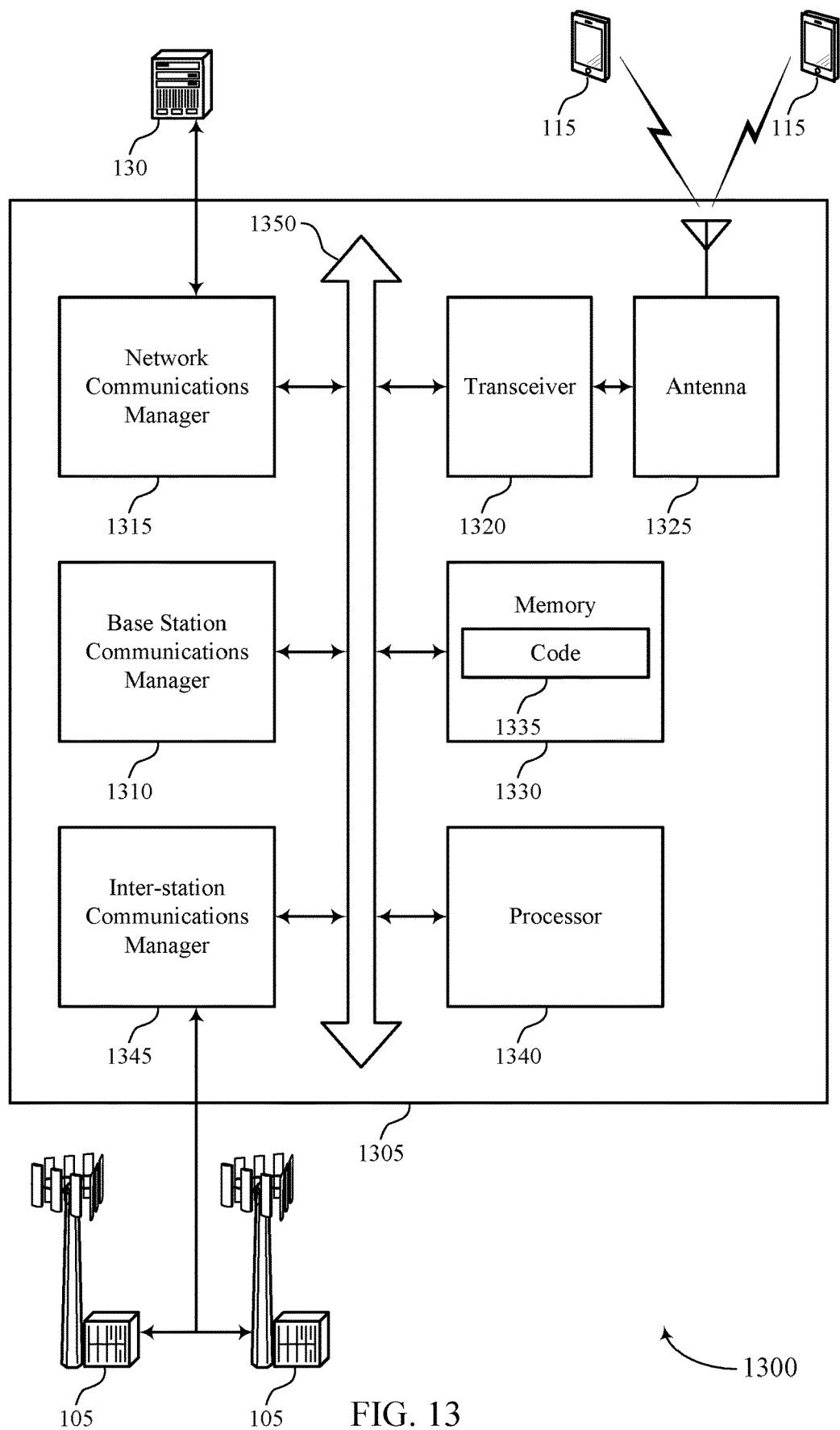
FIG. 13 shows a diagram of a system including a device that supports interference measurement based on multiple sensing resource candidates in accordance with aspects of the present disclosure.

FIG. 13 shows a diagram of a system 1300 including a device 1305 that supports interference measurement based on multiple sensing resource candidates in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may determine an allocation of a set of sensing resources and a set of cross-link interference measurement resources and transmit, to a UE a configuration message including the allocation of the set of sensing resources and the set of cross-link interference measurement resources associated with the set of sensing resources, and an indication to measure one or more cross-link interference measurement resources for cross-link interference based on the one or more cross-link interference measurement resources overlapping with a sensing resource of the set of sensing resources. The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases, the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices. The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting interference measurement based on multiple sensing resource candidates).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
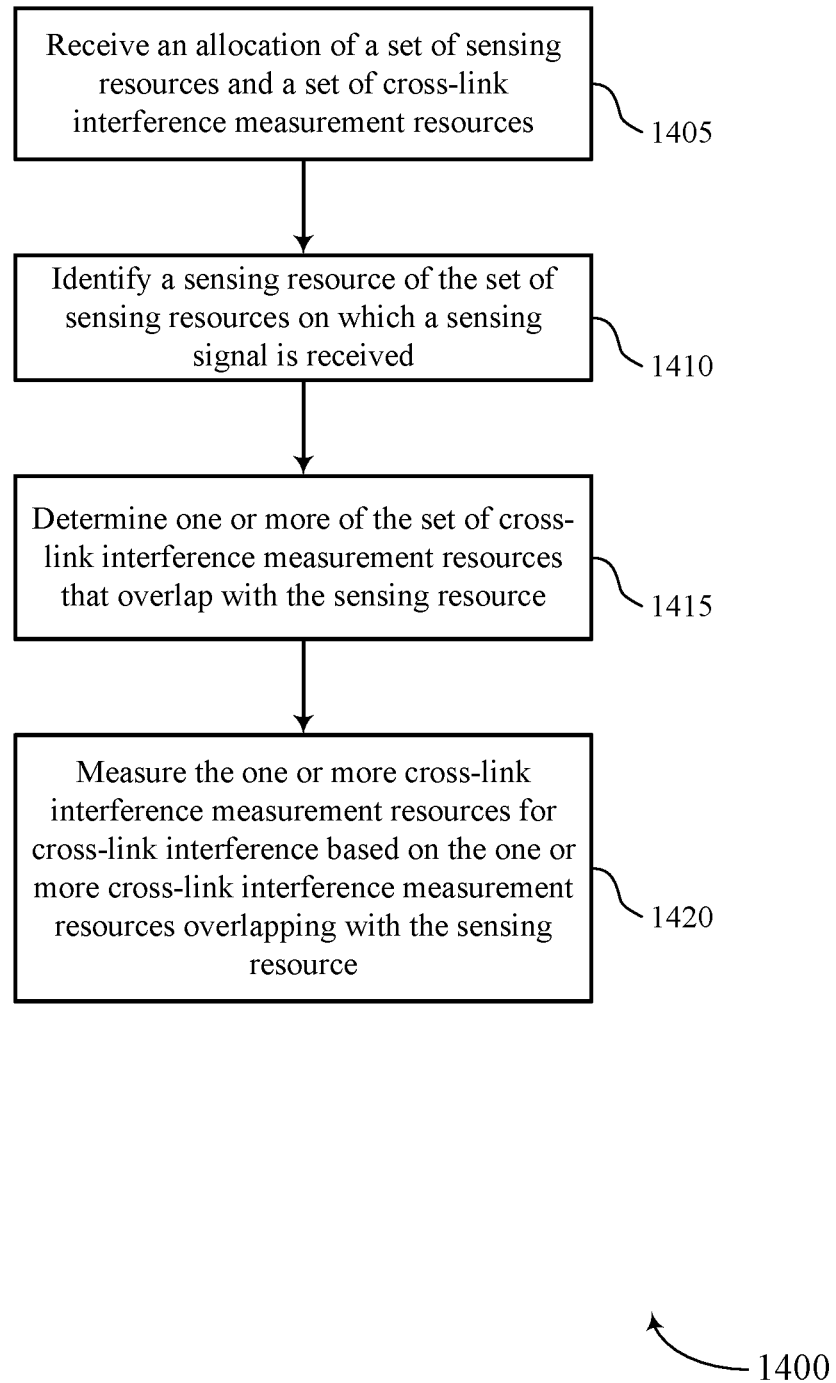
FIGS. 14 through 17 show flowcharts illustrating methods that support interference measurement based on multiple sensing resource candidates in accordance with aspects of the present disclosure.

FIG. 14 shows a flowchart illustrating a method 1400 that supports interference measurement based on multiple sensing resource candidates in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive an allocation of a set of sensing resources and a set of cross-link interference measurement resources. The operations of 1405 may be performed according to the methods described herein. In some examples, aspects of the operations of 1405 may be performed by a resource allocation component as described with reference to FIGS. 6 through 9.

At 1410, the UE may identify a sensing resource of the set of sensing resources on which a sensing signal is received. The operations of 1410 may be performed according to the methods described herein. In some examples, aspects of the operations of 1410 may be performed by a sensing resource component as described with reference to FIGS. 6 through 9.

At 1415, the UE may determine one or more of the set of cross-link interference measurement resources that overlap with the sensing resource. The operations of 1415 may be performed according to the methods described herein. In some examples, aspects of the operations of 1415 may be performed by a cross-link interference resource component as described with reference to FIGS. 6 through 9.

At 1420, the UE may measure the one or more cross-link interference measurement resources for cross-link interference based on the one or more cross-link interference measurement resources overlapping with the sensing resource. The operations of 1420 may be performed according to the methods described herein. In some examples, aspects of the operations of 1420 may be performed by an interference measurement component as described with reference to FIGS. 6 through 9.

Figure 15:
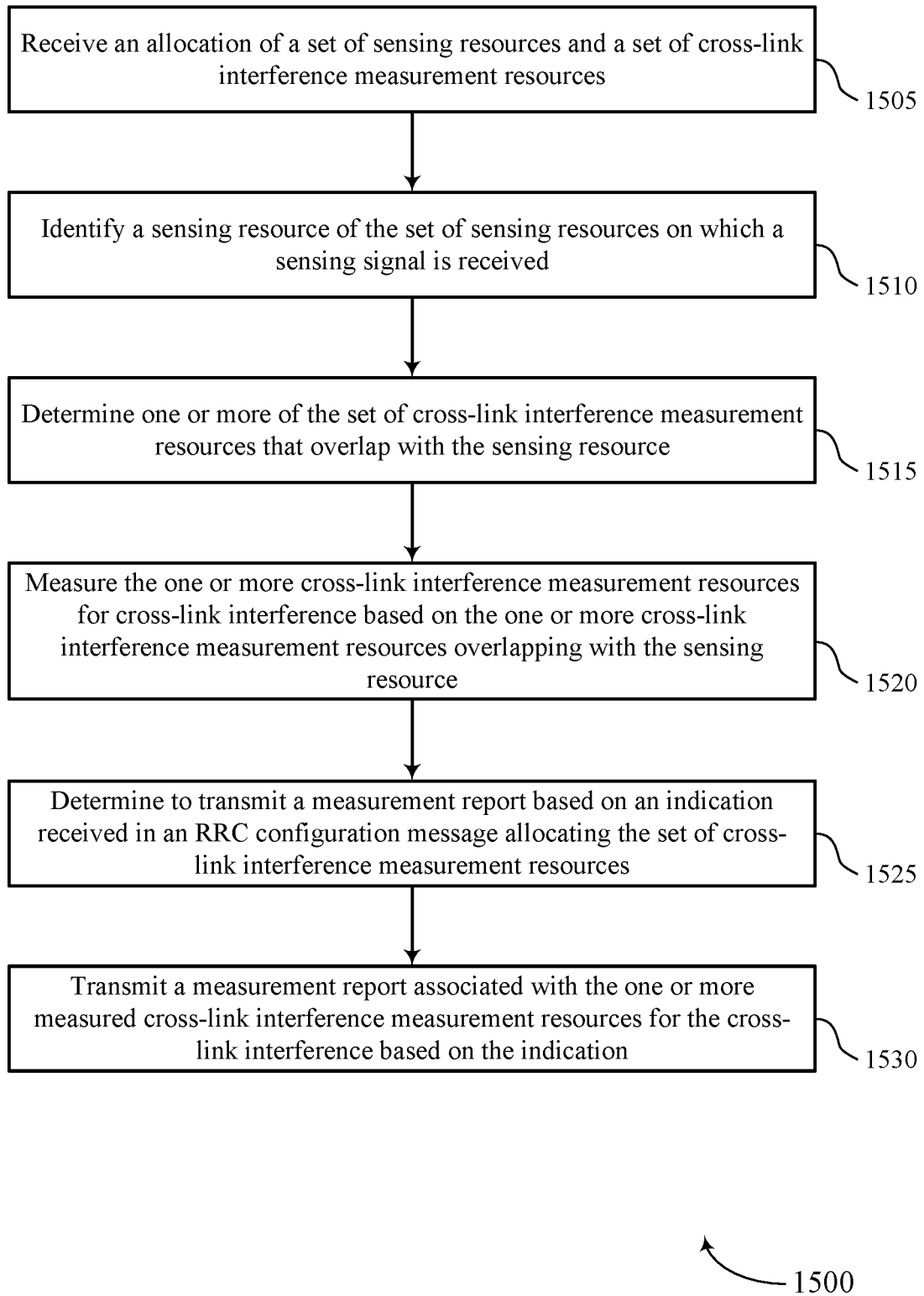

FIG. 15 shows a flowchart illustrating a method 1500 that supports interference measurement based on multiple sensing resource candidates in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive an allocation of a set of sensing resources and a set of cross-link interference measurement resources. The operations of 1505 may be performed according to the methods described herein. In some examples, aspects of the operations of 1505 may be performed by a resource allocation component as described with reference to FIGS. 6 through 9.

At 1510, the UE may identify a sensing resource of the set of sensing resources on which a sensing signal is received. The operations of 1510 may be performed according to the methods described herein. In some examples, aspects of the operations of 1510 may be performed by a sensing resource component as described with reference to FIGS. 6 through 9.

At 1515, the UE may determine one or more of the set of cross-link interference measurement resources that overlap with the sensing resource. The operations of 1515 may be performed according to the methods described herein. In some examples, aspects of the operations of 1515 may be performed by a cross-link interference resource component as described with reference to FIGS. 6 through 9.

At 1520, the UE may measure the one or more cross-link interference measurement resources for cross-link interference based on the one or more cross-link interference measurement resources overlapping with the sensing resource. The operations of 1520 may be performed according to the methods described herein. In some examples, aspects of the operations of 1520 may be performed by an interference measurement component as described with reference to FIGS. 6 through 9.

At 1525, the UE may determine to transmit a measurement report based on an indication received in an RRC configuration message allocating the set of cross-link interference measurement resources. The operations of 1525 may be performed according to the methods described herein. In some examples, aspects of the operations of 1525 may be performed by a report component as described with reference to FIGS. 6 through 9.

At 1530, the UE may transmit a measurement report associated with the one or more measured cross-link interference measurement resources for the cross-link interference based on the indication. The operations of 1530 may be performed according to the methods described herein. In some examples, aspects of the operations of 1530 may be performed by a report component as described with reference to FIGS. 6 through 9.

Figure 16:
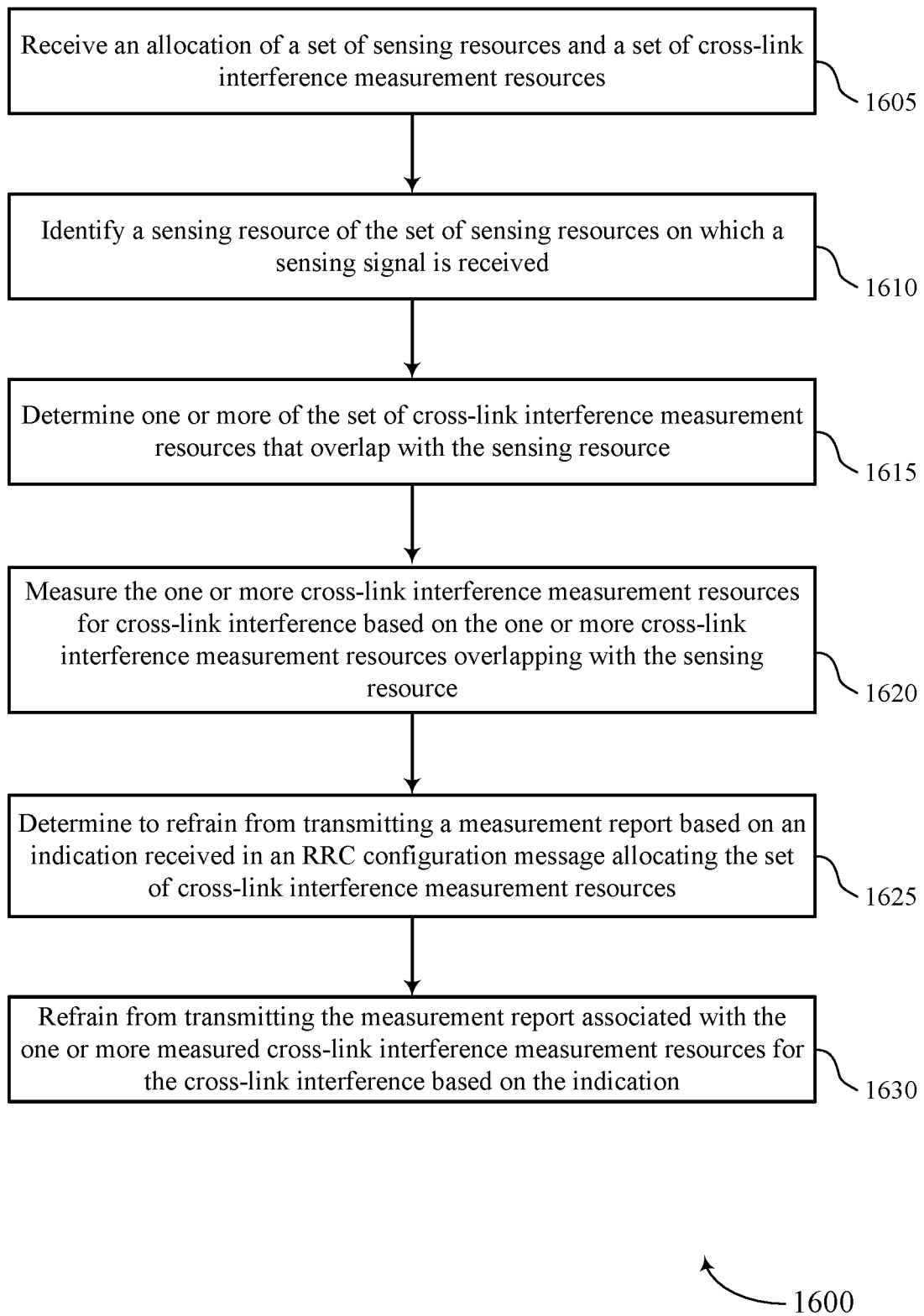

FIG. 16 shows a flowchart illustrating a method 1600 that supports interference measurement based on multiple sensing resource candidates in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive an allocation of a set of sensing resources and a set of cross-link interference measurement resources. The operations of 1605 may be performed according to the methods described herein. In some examples, aspects of the operations of 1605 may be performed by a resource allocation component as described with reference to FIGS. 6 through 9.

At 1610, the UE may identify a sensing resource of the set of sensing resources on which a sensing signal is received. The operations of 1610 may be performed according to the methods described herein. In some examples, aspects of the operations of 1610 may be performed by a sensing resource component as described with reference to FIGS. 6 through 9.

At 1615, the UE may determine one or more of the set of cross-link interference measurement resources that overlap with the sensing resource. The operations of 1615 may be performed according to the methods described herein. In some examples, aspects of the operations of 1615 may be performed by a cross-link interference resource component as described with reference to FIGS. 6 through 9.

At 1620, the UE may measure the one or more cross-link interference measurement resources for cross-link interference based on the one or more cross-link interference measurement resources overlapping with the sensing resource. The operations of 1620 may be performed according to the methods described herein. In some examples, aspects of the operations of 1620 may be performed by an interference measurement component as described with reference to FIGS. 6 through 9.

At 1625, the UE may determine to refrain from transmitting a measurement report based on an indication received in an RRC configuration message allocating the set of cross-link interference measurement resources. The operations of 1625 may be performed according to the methods described herein. In some examples, aspects of the operations of 1625 may be performed by a report component as described with reference to FIGS. 6 through 9.

At 1630, the UE may refrain from transmitting the measurement report associated with the one or more measured cross-link interference measurement resources for the cross-link interference based on the indication. The operations of 1630 may be performed according to the methods described herein. In some examples, aspects of the operations of 1630 may be performed by a report component as described with reference to FIGS. 6 through 9.

Figure 17:
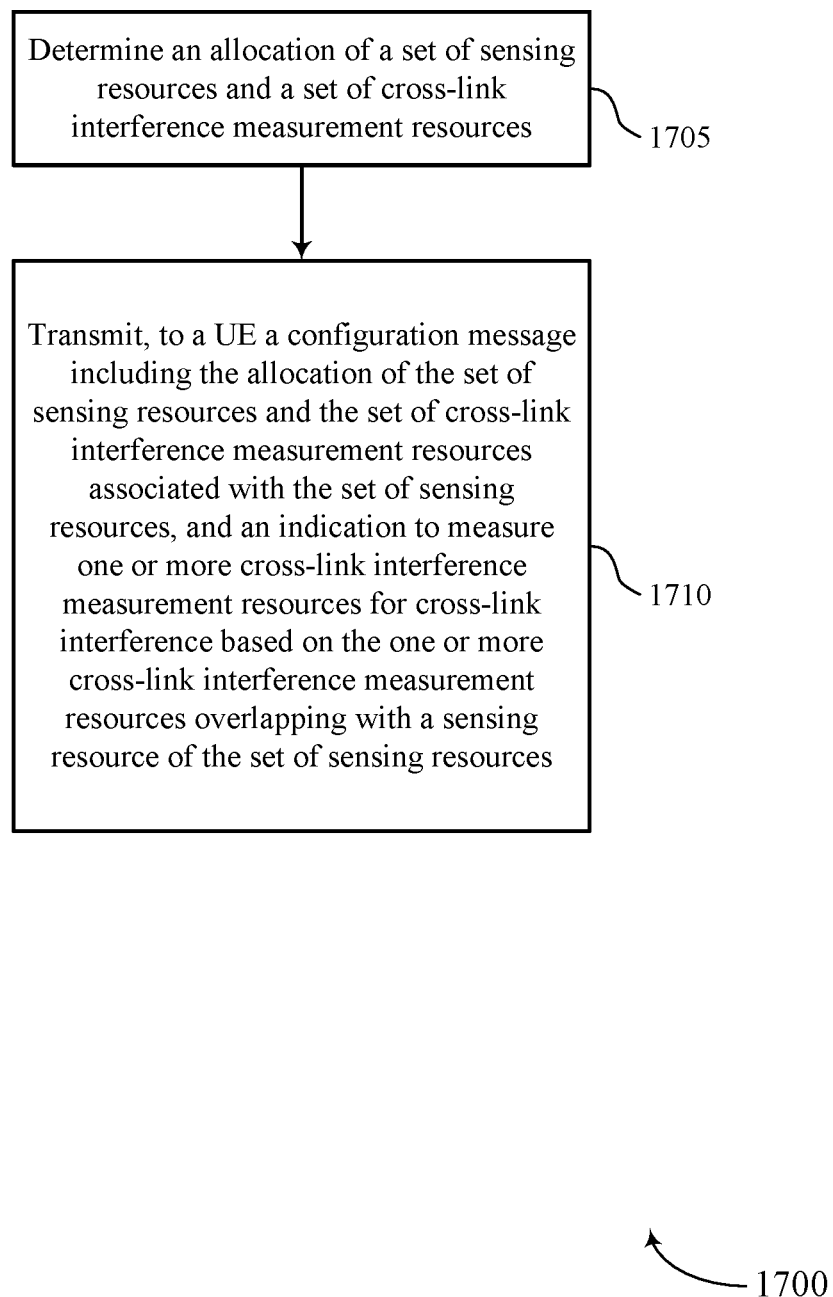

FIG. 17 shows a flowchart illustrating a method 1700 that supports interference measurement based on multiple sensing resource candidates in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may determine an allocation of a set of sensing resources and a set of cross-link interference measurement resources. The operations of 1705 may be performed according to the methods described herein. In some examples, aspects of the operations of 1705 may be performed by a resource allocation component as described with reference to FIGS. 10 through 13.

At 1710, the base station may transmit, to a UE a configuration message including the allocation of the set of sensing resources and the set of cross-link interference measurement resources associated with the set of sensing resources, and an indication to measure one or more cross-link interference measurement resources for cross-link interference based on the one or more cross-link interference measurement resources overlapping with a sensing resource of the set of sensing resources. The operations of 1710 may be performed according to the methods described herein. In some examples, aspects of the operations of 1710 may be performed by a configuration component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure.

Aspect 1: A method for wireless communication at a user equipment (UE), comprising: receiving an allocation of a set of sensing resources and a set of cross-link interference measurement resources; identifying a sensing resource of the set of sensing resources on which a sensing signal is received; determining one or more of the set of cross-link interference measurement resources that overlap with the sensing resource; and measuring the one or more cross-link interference measurement resources for cross-link interference based at least in part on the one or more cross-link interference measurement resources overlapping with the sensing resource.

Aspect 2: The method of aspect 1, wherein receiving the allocation of a set of sensing resources further comprises: receiving a configuration which includes a set of sensing resource identifiers; and determining the set of sensing resources based at least in part on the set of sensing resource identifiers.

Aspect 3: The method of any of aspects 1 or 2, further comprising: identifying a set of sensing parameters associated with the set of sensing resources, wherein at least one sensing parameter of the set of sensing parameters comprises a BWP.

Aspect 4: The method of any of aspects 1 to 3, wherein identifying the sensing resource of the set of sensing resources on which the sensing signal is received further comprises: receiving a configuration that identifies the sensing resource from the set of sensing resources.

Aspect 5: The method of any of aspects 1 to 4, further comprising: determining to transmit a measurement report based at least in part on an indication received in an RRC configuration message allocating the set of cross-link interference measurement resources; and transmitting a measurement report associated with the one or more measured cross-link interference measurement resources for the cross-link interference based at least in part on the indication.

Aspect 6: The method of any of aspects 1 to 5, further comprising: determining to refrain from transmitting a measurement report based at least in part on an indication received in an RRC configuration message allocating the set of cross-link interference measurement resources; and refraining from transmitting the measurement report associated with the one or more measured cross-link interference measurement resources for the cross-link interference based at least in part on the indication.

Aspect 7: The method of any of aspects 1 to 6, further comprising: determining a time and frequency resource pattern associated with the sensing resource of the set of sensing resources on which a sensing signal is received.

Aspect 8: The method of aspect 7, further comprising: determining a subcarrier location associated with the sensing resource of the set of sensing resources on which a sensing signal is received based at least in part on the time and frequency resource pattern associated with the sensing resource of the set of sensing resources.

Aspect 9: The method of aspect 7, further comprising: determining a symbol location associated with the sensing resource of the set of sensing resources on which a sensing signal is received based at least in part on the time and frequency resource pattern associated with the sensing resource of the set of sensing resources.

Aspect 10: The method of aspect 7, further comprising: determining a periodicity associated with the sensing resource of the set of sensing resources on which a sensing signal is received based at least in part on the time and frequency resource pattern associated with the sensing resource of the set of sensing resources.

Aspect 11: The method of aspect 7, further comprising: determining an offset associated with the sensing resource of the set of sensing resources on which a sensing signal is received based at least in part on the time and frequency resource pattern associated with the sensing resource of the set of sensing resources.

Aspect 12: The method of any of aspects 1 to 11, further comprising: receiving, from a base station, an RRC configuration message comprising the allocation of the set of sensing resources and the set of cross-link interference measurement resources.

Aspect 13: The method of any of aspects 1 to 12, wherein the measuring comprises: measuring a signal strength metric associated with the sensing signal on the one or more cross-link interference measurement resources, the signal strength metric comprising an RSRP or an RSSI, or both.

Aspect 14: The method of any of aspects 1 to 13, further comprising: determining the sensing resource of the set of sensing resources satisfies a threshold for sensing the sensing signal based at least in part on measuring the one or more cross-link interference measurement resources for the cross-link interference; and transmitting, to the base station, an indication of a resource index associated with the sensing resource.

Aspect 15: The method of any of aspects 1 to 14, further comprising: determining a maximum sensing range to use to determine a duration associated with the sensing signal based at least in part on the UE operating in a full-duplex mode; and determining the duration associated with the sensing signal using the maximum sensing range, wherein measuring the one or more cross-link interference measurement resources for the cross-link interference is based at least in part on the duration associated with the sensing signal.

Aspect 16: The method of any of aspects 1 to 15, further comprising: determining a minimum sensing range to use to determine a duration associated with the sensing signal based at least in part on the UE operating in a half-duplex mode; and determining the duration associated with the sensing signal using the minimum sensing range, wherein measuring the one or more cross-link interference measurement resources for the cross-link interference is based at least in part on the duration associated with the sensing signal.

Aspect 17: A method for wireless communication at a base station, comprising: determining an allocation of a set of sensing resources and a set of cross-link interference measurement resources; and transmitting, to a user equipment (UE) a configuration message comprising the allocation of the set of sensing resources and the set of cross-link interference measurement resources associated with the set of sensing resources, and an indication to measure one or more cross-link interference measurement resources for cross-link interference based at least in part on the one or more cross-link interference measurement resources overlapping with a sensing resource of the set of sensing resources.

Aspect 18: The method of aspect 17, wherein transmitting the configuration message comprises: transmitting a set of sensing resource identifiers associated with the set of sensing resources in the configuration message.

Aspect 19: The method of any of aspects 17 or 18, wherein transmitting the configuration message comprises: transmitting a set of sensing parameters associated with the set of sensing resources in the configuration message.

Aspect 20: The method of aspect 19, wherein at least one sensing parameter of the set of sensing parameters comprises a BWP.

Aspect 21: The method of any of aspects 17 to 20, wherein transmitting the configuration message further comprises: including, in the configuration message, an identifier which identifies the sensing resource from the set of sensing resources.

Aspect 22: The method of any of aspects 17 to 21, wherein the configuration message comprises an indication to the UE whether to transmit a measurement report to the base station associated with the UE measuring the one or more cross-link interference measurement resources for the cross-link interference based at least in part on the one or more cross-link interference measurement resources overlapping with the sensing resource of the set of sensing resources.

Aspect 23: The method of any of aspects 17 to 22, further comprising: assigning a time and frequency resource pattern associated with the set of sensing resources, wherein the configuration message comprises an indication of the time and frequency resource pattern associated with the set of sensing resources.

Aspect 24: The method of any of aspects 17 to 23, further comprising: assigning a subcarrier location associated with each sensing resource of the set of sensing resources, wherein the configuration message comprises an indication of the subcarrier location associated with each sensing resource of the set of sensing resources.

Aspect 25: The method of any of aspects 17 to 24, further comprising: assigning a symbol location associated with each sensing resource of the set of sensing resources, wherein the configuration message comprises an indication of the symbol location associated with each sensing resource of the set of sensing resources.

Aspect 26: The method of any of aspects 17 to 25, further comprising: assigning a periodicity associated with each sensing resource of the set of sensing resources, wherein the configuration message comprises an indication of the periodicity associated with each sensing resource of the set of sensing resources.

Aspect 27: The method of any of aspects 17 to 26, further comprising: assigning an offset associated with each sensing resource of the set of sensing resources, wherein the configuration message comprises an indication of the offset associated with each sensing resource of the set of sensing resources.

Aspect 28: The method of any of aspects 17 to 27, wherein the configuration message comprises a high layer message.

Aspect 29: The method of aspect 28, wherein the higher layer message comprises an RRC message.

Aspect 30: An apparatus for wireless communication comprising: a processor, memory coupled with the processor; and instructions stored in the memory and executable by the processor to cause the apparatus to perform a method of any of aspects 1 to 16.

Aspect 31: An apparatus comprising at least one means for performing a method of any of aspects 1 to 16.

Aspect 32: A non-transitory computer-readable medium storing code for wireless communications, the code comprising instructions executable by a processor to perform a method of any of aspects 1 to 16.

Aspect 33: An apparatus for wireless communication comprising: a processor, memory coupled with the processor; and instructions stored in the memory and executable by the processor to cause the apparatus to perform a method of any of aspects 17 to 29.

Aspect 34: An apparatus comprising at least one means for performing a method of any of aspects 17 to 29.

Aspect 35: A non-transitory computer-readable medium storing code for wireless communications, the code comprising instructions executable by a processor to perform a method of any of aspects 17 to 29.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving an allocation of a set of sensing resources and a set of cross-link interference measurement resources;
    identifying a sensing resource of the set of sensing resources on which a sensing signal is received;
    determining one or more of the set of cross-link interference measurement resources that overlap with the sensing resource; and
    measuring the one or more cross-link interference measurement resources for cross-link interference based at least in part on the one or more cross-link interference measurement resources overlapping with the sensing resource.

2. The method of claim 1, wherein receiving the allocation of a set of sensing resources further comprises:
    receiving a configuration which includes a set of sensing resource identifiers; and
    determining the set of sensing resources based at least in part on the set of sensing resource identifiers.

3. The method of claim 1, further comprising:
    identifying a set of sensing parameters associated with the set of sensing resources, wherein at least one sensing parameter of the set of sensing parameters comprises a bandwidth part.

4. The method of claim 1, wherein identifying the sensing resource of the set of sensing resources on which the sensing signal is received further comprises:
    receiving a configuration that identifies the sensing resource from the set of sensing resources.

5. The method of claim 1, further comprising:
   determining to transmit a measurement report based at least in part on an indication received in a radio resource control configuration message allocating the set of cross-link interference measurement resources; and
   transmitting the measurement report associated with the one or more measured cross-link interference measurement resources for the cross-link interference based at least in part on the indication.

6. The method of claim 1, further comprising:
   determining to refrain from transmitting a measurement report based at least in part on an indication received in a radio resource control configuration message allocating the set of cross-link interference measurement resources; and
   refraining from transmitting the measurement report associated with the one or more measured cross-link interference measurement resources for the cross-link interference based at least in part on the indication.

7. The method of claim 1, further comprising:
   determining a time and frequency resource pattern associated with the sensing resource of the set of sensing resources on which a sensing signal is received.

8. The method of claim 7, further comprising:
   determining a subcarrier location associated with the sensing resource of the set of sensing resources on which a sensing signal is received based at least in part on the time and frequency resource pattern associated with the sensing resource of the set of sensing resources.

9. The method of claim 7, further comprising:
   determining a symbol location associated with the sensing resource of the set of sensing resources on which a sensing signal is received based at least in part on the time and frequency resource pattern associated with the sensing resource of the set of sensing resources.

10. The method of claim 7, further comprising:
    determining a periodicity associated with the sensing resource of the set of sensing resources on which a sensing signal is received based at least in part on the time and frequency resource pattern associated with the sensing resource of the set of sensing resources.

11. The method of claim 7, further comprising:
    determining an offset associated with the sensing resource of the set of sensing resources on which a sensing signal is received based at least in part on the time and frequency resource pattern associated with the sensing resource of the set of sensing resources.

12. The method of claim 1, further comprising:
    receiving, from a base station, a radio resource control configuration message comprising the allocation of the set of sensing resources and the set of cross-link interference measurement resources.

13. The method of claim 1, wherein the measuring comprises:
    measuring a signal strength metric associated with the sensing signal on the one or more cross-link interference measurement resources, the signal strength metric comprising a reference signal received power or a received signal strength indicator, or both.

14. The method of claim 1, further comprising:
    determining the sensing resource of the set of sensing resources satisfies a threshold for sensing the sensing signal based at least in part on measuring the one or more cross-link interference measurement resources for the cross-link interference; and
    transmitting, to the base station, an indication of a resource index associated with the sensing resource.

15. The method of claim 1, further comprising:
    determining a maximum sensing range to use to determine a duration associated with the sensing signal based at least in part on the UE operating in a full-duplex mode; and
    determining the duration associated with the sensing signal using the maximum sensing range, wherein measuring the one or more cross-link interference measurement resources for the cross-link interference is based at least in part on the duration associated with the sensing signal.

16. The method of claim 1, further comprising:
    determining a minimum sensing range to use to determine a duration associated with the sensing signal based at least in part on the UE operating in a half-duplex mode; and
    determining the duration associated with the sensing signal using the minimum sensing range, wherein measuring the one or more cross-link interference measurement resources for the cross-link interference is based at least in part on the duration associated with the sensing signal.

17. An apparatus for wireless communication, comprising:
    a processor,
    memory coupled with the processor; and
    instructions stored in the memory and executable by the processor to cause the apparatus to:
       receive an allocation of a set of sensing resources and a set of cross-link interference measurement resources;
       identify a sensing resource of the set of sensing resources on which a sensing signal is received;
       determine one or more of the set of cross-link interference measurement resources that overlap with the sensing resource; and
       measure the one or more cross-link interference measurement resources for cross-link interference based at least in part on the one or more cross-link interference measurement resources overlapping with the sensing resource.

18. The apparatus of claim 17, wherein the instructions to receive the allocation of a set of sensing resources further are executable by the processor to cause the apparatus to:
    receive a configuration which includes a set of sensing resource identifiers; and
    determine the set of sensing resources based at least in part on the set of sensing resource identifiers.

19. The apparatus of claim 17, wherein the instructions are further executable by the processor to cause the apparatus to:
    identify a set of sensing parameters associated with the set of sensing resources, wherein at least one sensing parameter of the set of sensing parameters comprises a bandwidth part.

20. The apparatus of claim 17, wherein the instructions to identify the sensing resource of the set of sensing resources on which the sensing signal is received further are executable by the processor to cause the apparatus to:
    receive a configuration that identifies the sensing resource from the set of sensing resources.

21. The apparatus of claim 17, wherein the instructions are further executable by the processor to cause the apparatus to:

determine to transmit a measurement report based at least in part on an indication received in a radio resource control configuration message allocating the set of cross-link interference measurement resources; and transmit the measurement report associated with the one or more measured cross-link interference measurement resources for the cross-link interference based at least in part on the indication.

22. The apparatus of claim 17, wherein the instructions are further executable by the processor to cause the apparatus to:

determine to refrain from transmitting a measurement report based at least in part on an indication received in a radio resource control configuration message allocating the set of cross-link interference measurement resources; and refrain from transmitting the measurement report associated with the one or more measured cross-link interference measurement resources for the cross-link interference based at least in part on the indication.

23. The apparatus of claim 17, wherein the instructions are further executable by the processor to cause the apparatus to:

determine a time and frequency resource pattern associated with the sensing resource of the set of sensing resources on which a sensing signal is received.

24. The apparatus of claim 23, wherein the instructions are further executable by the processor to cause the apparatus to:

determine a subcarrier location associated with the sensing resource of the set of sensing resources on which a sensing signal is received based at least in part on the time and frequency resource pattern associated with the sensing resource of the set of sensing resources.

25. The apparatus of claim 23, wherein the instructions are further executable by the processor to cause the apparatus to:

determine a symbol location associated with the sensing resource of the set of sensing resources on which a sensing signal is received based at least in part on the time and frequency resource pattern associated with the sensing resource of the set of sensing resources.

26. The apparatus of claim 23, wherein the instructions are further executable by the processor to cause the apparatus to:

determine a periodicity associated with the sensing resource of the set of sensing resources on which a sensing signal is received based at least in part on the time and frequency resource pattern associated with the sensing resource of the set of sensing resources.

27. The apparatus of claim 23, wherein the instructions are further executable by the processor to cause the apparatus to:

determine an offset associated with the sensing resource of the set of sensing resources on which a sensing signal is received based at least in part on the time and frequency resource pattern associated with the sensing resource of the set of sensing resources.

28. The apparatus of claim 17, wherein the instructions are further executable by the processor to cause the apparatus to:

receive, from a base station, a radio resource control configuration message comprising the allocation of the set of sensing resources and the set of cross-link interference measurement resources.

29. An apparatus for wireless communication, comprising:

means for receiving an allocation of a set of sensing resources and a set of cross-link interference measurement resources;

means for identifying a sensing resource of the set of sensing resources on which a sensing signal is received;

means for determining one or more of the set of cross-link interference measurement resources that overlap with the sensing resource; and means for measuring the one or more cross-link interference measurement resources for cross-link interference based at least in part on the one or more cross-link interference measurement resources overlapping with the sensing resource.

30. A non-transitory computer-readable medium storing code for wireless communication at a user equipment (UE), the code comprising instructions executable by a processor to:

receive an allocation of a set of sensing resources and a set of cross-link interference measurement resources;

identify a sensing resource of the set of sensing resources on which a sensing signal is received;

determine one or more of the set of cross-link interference measurement resources that overlap with the sensing resource; and measure the one or more cross-link interference measurement resources for cross-link interference based at least in part on the one or more cross-link interference measurement resources overlapping with the sensing resource.

* * * * *